(12) United States Patent
Chen et al.

(10) Patent No.: US 9,590,253 B2
(45) Date of Patent: Mar. 7, 2017

(54) CORE-SHELL STRUCTURED BIFUNCTIONAL CATALYSTS FOR METAL AIR BATTERY/FUEL CELL

(71) Applicants: Zhongwei Chen, Waterloo (CA); Zhu Chen, Toronto (CA)

(72) Inventors: Zhongwei Chen, Waterloo (CA); Zhu Chen, Toronto (CA)

( * ) Notice: Subject to any disclaimer, the term of this patent is extended or adjusted under 35 U.S.C. 154(b) by 82 days.

(21) Appl. No.: 13/941,139

(22) Filed: Jul. 12, 2013

(65) Prior Publication Data

US 2014/0023939 A1    Jan. 23, 2014

Related U.S. Application Data

(63) Continuation of application No. PCT/CA2012/050050, filed on Jan. 27, 2012.

(60) Provisional application No. 61/457,200, filed on Jan. 28, 2011.

(51) Int. Cl.
| | |
|---|---|
| *H01M 4/90* | (2006.01) |
| *H01M 4/86* | (2006.01) |
| *H01M 4/96* | (2006.01) |
| *H01M 12/06* | (2006.01) |

(52) U.S. Cl.
CPC ....... *H01M 4/9016* (2013.01); *H01M 4/8615* (2013.01); *H01M 4/96* (2013.01); *H01M 12/06* (2013.01); *Y02E 60/50* (2013.01)

(58) Field of Classification Search
CPC .................................................. H01M 4/8615
See application file for complete search history.

(56) References Cited

U.S. PATENT DOCUMENTS

| | | | |
|---|---|---|---|
| 4,115,322 A | 9/1978 | Morcos | 252/447 |
| 4,146,458 A | 3/1979 | Horowitz et al. | 204/277 |
| 4,457,824 A | 7/1984 | Dempsey et al. | 204/290 |
| 5,656,388 A | 8/1997 | Bugga et al. | 429/40 |
| 6,069,107 A | 5/2000 | Kuznetsov et al. | 502/101 |
| 2003/0173548 A1 | 9/2003 | Ndzebet et al. | 252/500 |
| 2004/0048215 A1 | 3/2004 | Wong | 431/344 |
| 2007/0111095 A1 | 5/2007 | Padhi et al. | 429/224 |
| 2007/0166602 A1 | 7/2007 | Burchardt | 429/44 |
| 2010/0167175 A1 | 7/2010 | Dopp et al. | 429/516 |
| 2011/0136024 A1 | 6/2011 | Seymour | 429/405 |
| 2011/0274989 A1* | 11/2011 | Lu et al. | 429/405 |
| 2012/0100986 A1 | 4/2012 | Dopp et al. | 502/159 |

FOREIGN PATENT DOCUMENTS

CN            101492576           7/2009

OTHER PUBLICATIONS

U.S. Appl. No. 12/960,002, filed Dec. 2010, Tan et al.*

(Continued)

*Primary Examiner* — Patrick Ryan
*Assistant Examiner* — Christopher Domone
(74) *Attorney, Agent, or Firm* — J. Peter Paredes; David G. Rosenbaum; Rosenbaum IP, P.C.

(57) ABSTRACT

The present invention relates to a bifunctional catalyst for use with air metal batteries and fuel cell. The bifunctional catalyst comprising a core and a shell, where the core comprises a metal oxide and the shell comprises a carbon nanostructure. In a further aspect the bifunctional catalyst is catalytically active for oxygen reduction and oxygen evolution reactions.

16 Claims, 17 Drawing Sheets

(56) References Cited

OTHER PUBLICATIONS

EP Supplementary Search Report, dated May 28, 2014, for EP Publication 2668688 as published on Dec. 4, 2013; pp. 1-2.
Baker, R., et al , "Electrocatalytic activity and stability of substituted iron phthalocyanines towards oxygen reduction evaluated at different temperatures" *Electrochim. Acta* 53: 6906-6919 (2008).
Bezerra, C. W. B., et al., "A review of heat-treatment effects on activity and stability of PEM fuel cell catalysts for oxygen reduction reaction" *J Power Sources* 173: 891-908 (2007).
Bezerra, C. W. B., et al., "Novel carbon-supported Fe-N electrocatalysts synthesized through heat treatment of iron tripyridyl triazine complexes for the PEM fuel cell oxygen reduction reaction" *Electrochim Acta* 53: 7703-7710 (2007).
Bursell, M., et al., "La0.6Ca0.4CoO3, La0.1Ca0.9MnO3 and LaNiO3 as bifunctional oxygen electrodes" *Electrochim. Acta* 47: 1651-1660 (2002).
Chan, C. K. et al., "Fast, completely reversible Li insertion in vanadium pentoxide nanoribbons" *Nano Lett.* 7(2): 490-495 (2007).
Chen, Z., et al., "Supportless Pt and PtPd nanotubes as electrocatalysts for oxygen reduction reactions" *Angew. Chem. Int. Edit.* 119: 4138-4141 (2007).
Chen, Z., et al., "Highly active nitrogen-doped carbon nanotubes for oxygen reduction reaction in fuel cell applications" *J. Phys. Chem. C* 113: 21008-21013 (2009).
Chen, J. Y., et al., "Shape-controlled synthesis of platinum nanocrystals for catalytic and electrocatalytic applications" *Nano Today* 4: 81-95 (2009).
Chen, Z., et al., "Nitrogen doped carbon nanotubes and their impact on the oxygen reduction reaction in fuel cells" *Carbon* 48: 3057-3065 (2010).
Chen, Z., et al., "Highly durable and active non-precious air cathode catalyst for zinc air battery" *J Power Sources* 196: 3673-3677 (2011).
Chen, Z., et al., "A review on non-precious metal electrocatalysts for PEM fuel cells" *Energ Environ Sci* 4: 3167-3192 (2011).
Choi, J. Y., et al., "Highly active porous carbon-supported nonprecious metal-n electrocatalyst for oxygen reduction reaction in pem fuel cells" *J. Phys. Chem. C* 114: 8048-8053 (2010).
Cui, L. F., et al., "Carbon-silicon core-shell nanowires as high capacity electrode for lithium ion batteries" *Nano Lett.* 9(9): 3370-3374 (2009).
Gamburzev, S., et al. "Development of a novel metal hydride-air secondary battery" *J. Appl. Electrochem* 28: 545-549 (1998).
Girishkumar, G., et al., "Lithium-air battery: Promise and challenges" *J. Phys. Chem. Lett.* 1: 2193-2203 (2010).
Gong, K.P., et al., "Nitrogen-doped carbon nanotube arrays with high electrocatalytic activity for oxygen reduction" *Science* 323: 760-764 (2009).
Gorlin, Y., et al., "A bifunctional nonprecious metal catalyst for oxygen reduction and water oxidation" *J Am Chem Soc* 132: 13612-13614 (2010).
Higgins, D., et al., "Nitrogen doped carbon nanotubes synthesized from aliphatic diamines for oxygen reduction reaction" *Electrochim Acta* 56: 1570-1575 (2011).
Jaouen, F., et al., "O2 reduction mechanism on non-noble metal catalysts for PEM fuel cells. Part I: Experimental rates of O2 electroreduction, H2O2 electroreduction, and H2O2 disproportionation" *J. Phys. Chem. C* 113: 15422-15432 (2009).
Jörissen, L., "Journal of power sources" 155: 23-32 (2006).
Kundu, S., et al., "The formation of nitrogen containing functional groups on carbon nanotube surfaces: a quantitative XPS and TPD study" *Phys. Chem. Chem. Phys* 12: 4351-4359 (2010).
Lee, H., et al., Morphological control of catalytically active platinum nanocrystals: *Angew. Chem. Int. Edit.* 118: 7988-7992 (2006).
Lee, K., et al., "Oxygen reduction reaction (ORR) catalyzed by carbon-supported cobalt polypyrrole (Co-PPy/C) electrocatalysts" *Electrochim. Acta* 54: 4704-4711 (2009).
Lee, H. W., et al., "ultrathin spinel limn(2)o(4) nanowires as high power cathode materials for li-ion batteries" *Nano Lett.* 10: 3852-3856 (2010).
Lee, J. S., et al., "Metal-air batteries with high energy density: li-air versus zn-air" *Adv. Energy Mater* 1: 34-50 (2010).
Lee, J. S., et al., "ketjenblack carbon supported amorphous manganese oxides nanowires as highly efficient electrocatalyst for oxygen reduction reaction in alkaline solutions" *Nano Lett* 11: 5362-5366 (2011).
Lefevre, M., et al., "Iron-based catalysts with improved oxygen reduction activity in polymer electrolyte fuel cells" *Science* 324: 71-74 (2009).
Lim, B. W., et al., "Facile synthesis of highly faceted multioctahedral pt nanocrystals through controlled overgrowth" *Nano Lett.* 8(11): 4043-4047 (2008).
Lim, B., et al., :Pd-Pt bimetallic nanodendrites with high activity for oxygen reduction *Science* 324: 1302-1305 (2009).
Lim, B., et al., Nucleation and growth mechanisms for Pd-Pt bimetallic nanodendrites and their electrocatalytic properties: *Nano Res* 3(2): 69-80 (2010).
Lim, B., et al., "Shaping a bright future for platinum-based alloy electrocatalysts" *Angew. Chem. Int. Edit* 49: 9819-9820 (2010).
Liu, H., et al., "High-surface-area CoTMPP/C synthesized by ultrasonic spray pyrolysis for PEM fuel cell electrocatalysts" *Electrochim Acta* 52: 4532-4538 (2007).
Lu, Y., et al., "Platinum-gold nanoparticles: A highly active bifunctional electrocatalyst for rechargeable lithium-air batteries" *J. Am. Chem. Soc.* 132(35): 12170-12171 (2010).
Lu, Y. C., et al. The discharge rate capability of rechargeable Li-O(2) batteries: *Energ Environ Sci* 4: 2999-3007 (2011).
Lukic, S., et al., "Energy storage systems for automotive applications" *IEEE T Ind Electron* 55(6): 2258-2267 (2008).
Neburchilov, V., et al., A review on air cathodes for zinc-air fuel cells: *J Power Sources* 195: 1271-1291 (2010).
Park, M. H., et al., "Silicon nanotube battery anodes" *Nano Lett.* 9(11): 3844-3847 (2009).
Qu, L. T., et al., Nitrogen-doped graphene as efficient metal-free electrocatalyst for oxygen reduction in fuel cells: *Acs Nano* 4(3): 1321-1326 (2010).
Scrosati, B., et al., "Lithium batteries: Status, prospects and future" *J. Power Sources* 195: 2419-2430 (2010).
Shao, M. H., et al., Structural dependence of oxygen reduction reaction on palladium nanocrystals: *Chem. Commun* 47, 6566-6568. (2011).
Suntivich, J.,et al., A perovskite oxide optimized for oxygen evolution catalysis from molecular orbital principles *Science* 334: 1383-1385 (2011).
Tang, Y. F., et al., "Electrocatalytic activity of nitrogen-doped carbon nanotube cups" *J. Am. Chem. Soc.* 131: 13200-13201 (2009).
Thiele, D., et al., "Electrochemical characterisation of air electrodes based on La0.6Sr0.4CoO3 and carbon nanotubes" *J. Power Sources* 183: 590-594 (2008).
Wagner, F. T., et al., "Electrochemistry and the future of the automobile" *J Phys Chem Lett* 1: 2204-2219 (2010).
Wu, G., et al., "Carbon-supported Co1.67Te2 nanoparticles as electrocatalysts for oxygen reduction reaction in alkaline electrolyte" *J. Mater. Chem.* 19: 6581-6589 (2009).
Yu, T., et al., "Platinum concave nanocubes with high-index facets and their enhanced activity for oxygen reduction reaction" *Angew. Chem. Int. Edit.* 50: 2773-2777 (2011).
Zhang, G.Q., et al., "MnO2/MCMB electrocatalyst for all solid state alkaline zinc-air cells" *Electrochem. Acta* 49: 873-877 (2004).
Zhang, G.Q., et al., "Self-assembly preparation of mesoporous hollow nanospheric manganese dioxide and its application in zinc-air battery" *J. Solid State Electrochem.* 10, 995-1001 (2006).
Zheng, G. Y., et al., "Hollow carbon nanofiber-encapsulated sulfur cathodes for high specific capacity rechargeable lithium batteries" *Nano Lett.* 11: 4462-4467 (2011).
Zhu, S. M., et al., Nitrogen-doped carbon nanotubes as air cathode catalysts in zinc-air battery: *Electrochim. Acta* 56: 5080-5084 (2011).

(56) References Cited

OTHER PUBLICATIONS

International Search Report issued in corresponding PCT International Application No. PCT/CA2012/050050, pp. 1-4.
Written Opinion issued in corresponding PCT International Application No. PCT/CA2012/050050, pp. 1-5.
Higgins, D., et al., "Nitrogen doped carbon nanotube thin films as efficient oxygen reduction catalyst for alkaline anion exchange membrane fuel cell" *ECS Transactions* 28(23): 63-68 (2010).
Chinese Official Action issued in a corresponding foreign application, pp: 1-5 (Sep. 5, 2016) Includes English translation.

* cited by examiner

CNT

BCNT

NCNT

Comparison of different CNT based catalysts

LaNiO$_3$-CNT oxygen reduction reaction

LaNiO$_3$-CNT full range degradation test

CSBC oxygen reduction reaction

CSBC full range degradation test

LaNiO$_3$ oxygen reduction reaction

LaNiO$_3$ full range degradation test

Comparison of oxygen reduction reaction

Comparison of full range degradation results

CORE-SHELL STRUCTURED BIFUNCTIONAL CATALYSTS FOR METAL AIR BATTERY/FUEL CELL

CROSS REFERENCE TO PRIOR APPLICATIONS

The present invention is a continuation and claims priority under 35 U.S.C. §120 and §365(c) to PCT International Patent Application PCT/CA2012/050050, filed Jan. 27, 2012, which claims priority to U.S. Provisional Patent Application Ser. No. 61/457,200, filed Jan. 28, 2011, all of which are incorporated by reference in their entireties.

FIELD OF THE INVENTION

The present invention relates to the field of catalysts for metal air batteries and fuel cells.

BACKGROUND OF THE INVENTION

Metal-air batteries and metal-air fuel cells are very promising technologies that provide alternatives to the currently predominant fossil fuels, for energy conversion. Metals such as zinc, aluminum and lithium can be used as the fuel for the metal-air batteries/fuel cells. During battery/fuel cell discharge, oxidation of these metals (i.e., Zn and Al) occurs on the anode and releases electrons that are transported via an external circuit to the cathode where oxygen reduction reaction converts the oxygen from air to hydroxide ions. Depletion of the metal fuel is inevitable in the primary metal-air battery/fuel cell, thus a continuous supply of metal is required for long term operation.

Introducing oxygen evolution on the cathode can mitigate this effect by allowing the regeneration of zinc oxide on the anode. However, the oxygen reduction and oxygen evolution reactions have large overpotentials and sluggish reaction kinetics. Therefore, to realize large scale application of metal air battery/fuel cells, active, stable and affordable catalysts are required to improve device performance.

Previous approaches to catalysts for metal air batteries are reported in numerous journal articles and patents. Jörissen et al. 1 reviewed many bifunctional catalysts made with various materials including the perovskite, spinel and pyrochlore type mixed metal oxides. However, the authors indicate that further research on this topic is needed. Lu et al. 2 describe a bifunctional catalyst based on platinum and gold, however the high cost of the catalyst discourages large scale implementation.

In US2007/0166602 A1,3 oxygen reduction catalyst and various oxides (i.e., CoWO4, La2O3) are combined to show high bifunctional activity. In US2007/0111095,4 manganese oxide contained in octahedral molecular seives was used as catalyst for metal air electrodes. In US2004/0048215,5 a metal cell containing a two layer cathode structure, used AgMnO4 as a catalyst precursor to produce a fine dispersion of MnO2 and Ag. However, the resultant cathode is not bifunctional.

Another approach involved introducing catalysts that are innately bifunctional, that is, one catalyst that has the ability to catalyze oxygen reduction and evolution reactions 6. However, such bifunctional materials were found to be limited by low activity and current densities.

Despite the various approaches described above, there remains a need for catalysts for use in metal air batteries and fuel cells having good activity and stability.

SUMMARY OF THE INVENTION

In one aspect of the invention there is provided a bifunctional catalyst for a metal air batter or fuel cell comprising:
  a) a core comprising one or more metal oxides and
  b) a shell comprising one or more carbon nanostructures.

In a further aspect of the invention there is a provided a bifunctional catalyst having a metal oxide core and a carbon nanostructure shell wherein the core functions predominantly as an oxygen evolution reaction catalyst and the shell functions predominantly as an oxygen reduction reaction catalyst.

In a further aspect of the invention the bifunctional catalyst is prepared by a method comprising:
  a) obtaining a metal oxide core and
  b) depositing a carbon nanostructure onto the metal oxide core.

In a further aspect of the invention there is provided a method of making a bifunctional catalyst for a metal air battery or metal air fuel cell comprising the steps of:
  a) obtaining a metal oxide core and
  b) depositing a carbon nanostructure onto the metal oxide core.

In a particular aspect of the method the carbon nanostructure is deposited onto the metal oxide core by chemical vapour deposition (CVD).

In a further aspect of the invention there is provided an air electrode comprising a bifunctional catalyst of the invention.

In a further aspect of the invention there is provided a metal air battery or fuel cell comprising a bifunctional catalyst of the invention.

In still a further aspect of the invention there is provided a method of making a bifunctional air electrode comprising:
  a) forming an active layer by:
    (i) mixing a pore forming material, a binding material, and a bifunctional catalyst to produce an agglomerate;
    (ii) adding an organic solvent to the dry agglomerate to produce a paste;
    (iii) calendering the paste into a thin sheet to form an active layer;
  b) forming a gas diffusion layer by:
    (i) mixing a pore forming material and a binding material to produce an agglomerate;
    (ii) adding an organic solvent to the dry agglomerate to produce a paste;
    (iii) calendering the paste into a thin sheet to form a gas diffusion layer;
  c) combining said active layer and said gas diffusion layer;
  d) pressing a current collector into either of the layers to form the gas diffusion electrode.

BRIEF DESCRIPTION OF THE DRAWINGS

The features of the invention will become more apparent in the following detailed description in which reference is made to the appended drawings wherein:

In FIGS. 11b), c) and d), the discharge duration is 10 seconds, the charge duration is also 10 seconds, which makes one cycle 20 seconds. The entire temporal duration of the charge-discharge test is 1000 seconds.

In FIGS. 12 b), c) and d), the discharge duration is 300 seconds and the charge duration is 300 seconds, which makes one cycle to be 600 seconds. The entire temporal duration of the charge-discharge test is 45000 seconds.

DETAILED DESCRIPTION OF THE INVENTION

Figure 1:
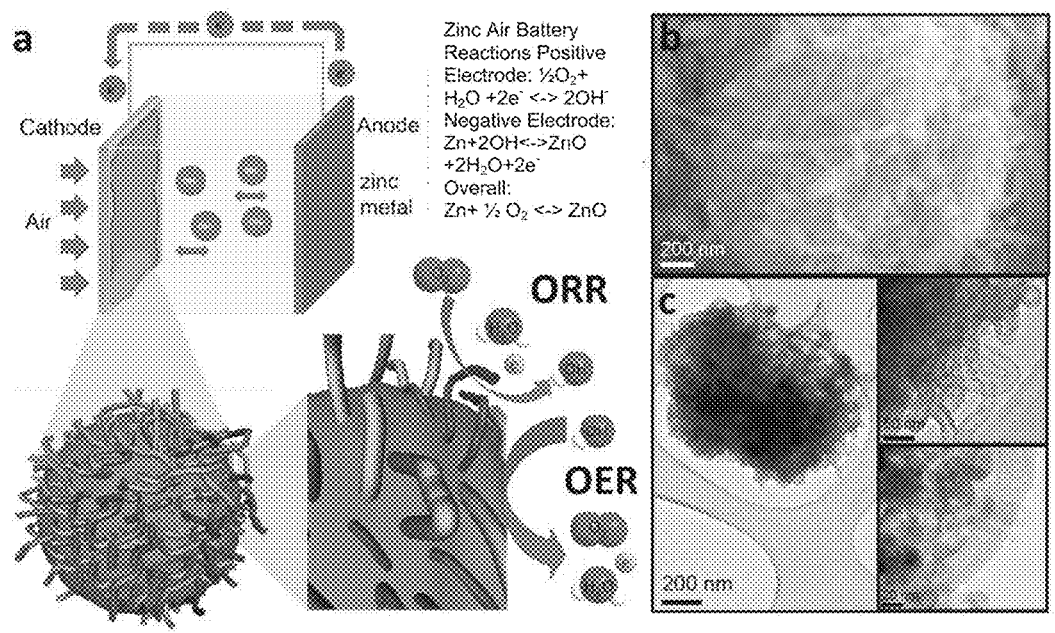
FIG. 1 a) shows a schematic of a zinc air battery and the catalysis of the oxygen reduction reaction (ORR) and oxygen evolution reactions (OER) by the shell and core of the core-shell structured bifunctional catalyst (CSBC); b) shows a scanning electron microscopy (SEM) image of the core-shell structured bifunctional catalyst and c) shows a transmission electron microscopy (TEM) image of the core-shell structured bifunctional catalyst illustrating the nitrogen doped carbon nanotube (NCNT) on the surface of the core particle.

In an embodiment of the invention there is provided a bifunctional catalyst having a core-shell structure. In a further embodiment the core-shell bifunctional catalyst (CSBC) is suitable for use in a metal air battery or fuel cell. In still a further embodiment the CSBC is catalytically active for oxygen reduction and oxygen evolution reactions.

The term "oxygen reduction catalyst" as used herein means a catalyst that predominantly catalyzes oxygen reduction reaction activity over other reactions such as oxygen evolution.

The term "oxygen evolution catalyst" as used herein means a catalyst that predominantly catalyzes oxygen evolution reaction activity over other reactions such as oxygen reduction.

The term "bifunctional catalyst" as used herein means a catalyst that catalyzes both the oxygen reduction reaction and the oxygen evolution reaction.

The term "core-shell bifunctional catalyst" and "core-corona bifunctional catalyst" are used interchangeably herein and refer to a bifunctional catalyst having a core comprising a first material and a shell or corona comprising a second material which is located substantially on the surface of the core material but not completely covering the core.

The terms "comprise", "comprises", "comprised" or "comprising" may be used in the present description. As used herein (including the specification and/or the claims), these terms are to be interpreted as specifying the presence of the stated features, integers, steps or components, but not as precluding the presence of one or more other feature, integer, step, component or a group thereof as would be apparent to persons having ordinary skill in the relevant art.

In a particular embodiment of the invention the combination of the oxygen evolution catalyst and oxygen reduction catalyst takes the form of a core-shell structure bifunctional catalyst. In a further aspect, the bifunctional catalyst can increase the stability and/or activity of the catalyst when compared to the performance of these catalysts when used separately on an equal mass basis.

Metal Oxides

In an embodiment of the invention the core material comprises one or more metal oxides. Metal oxides suitable as oxygen reaction catalysts and particularly suitable as oxygen evolution reaction catalysts are known in the art.

In a further embodiment of the invention the core material is one or more metal oxides such as, but not limited to perovskite, pyrochlore, spinel, and Ruddlesden Popper phase structures.

In a suitable embodiment the metal oxides is, $La_{n+1}Ni_nO_{3n+1}$, such as, $LaNiO_3$.

In a further embodiment the core comprises one or more metal oxides such as:

$La_{1-x}A_xFe_{1-y}Mn_yO_3$ wherein A is Sr or Ca;

$La_{0.6}Ca_{0.4}Co_{1-x}B_xO_3$ wherein B is Mn, Fe, Co, Ni or Cu;

$AB_2O_4$, wherein A is Mg, Fe, Ni, Mn, or Zn and B=Al, Fe, Co, Cr, or Mn; or $Pb_2M_{2-x}Pb_xO_7$ wherein M is Ru or Ir.

Other oxides including transition metal oxides such as manganese, iron and nickel oxides can also be used as core material.

In a particular embodiment of the invention the metal oxide acts predominantly as an oxygen evolution reaction catalyst.

In another embodiment the core may further include an additive or filler agent.

Carbon Nanostructures

In a suitable embodiment the shell of the bifunctional catalyst comprises one or more carbon nanostructures. The one or more carbon nanostructures are deposited on the catalyst core and may be bound to the catalyst core.

Suitable carbon nanostructures include carbon nanotube, carbon nanofibres, spherical carbon structures such as fullerenes ("buckyballs"), carbon graphene having a honeycomb like structure, and carbon nanocone structures. In a further aspect the morphology of the carbon nanostructure is a particle, rod, wire, fibre or tube.

In a further embodiment the carbon nanostructure has an elongate or linear structure where at least one end of the linear carbon nanostructure is bound to the core. In a particular embodiment the carbon nanostructure is a carbon nanotube or carbon nanofibre. In a further embodiment the carbon nanostructure is a carbon nanotube.

Without wishing to be bound by theory it is believed that the use of elongate or linear carbon nanostructures bound to the core provides a large amount of surface area for catalytic activity while still allowing access to the core material for catalysis of the oxygen evolution reaction.

In a further embodiment the carbon nanostructure may be doped. The term doped as used herein refers to the addition of non-carbon elements to the carbon nanostructure. In a suitable embodiment the carbon nanostructure is nitrogen doped or boron doped. In a particular embodiment the carbon nanostructure is a nitrogen doped nanostructure.

In a particular embodiment the shell comprises nitrogen doped carbon nanotubes.

Without wishing to be bound by theory, it is believed that the nitrogen doping of the carbon nanotube causes different distances between the carbon-carbon adjacent elements and the carbon-nitrogen adjacent elements which is thought to improve the catalytic activity of the shell of the core-shell bifunctional catalyst. The incorporation of nitrogen also improves the ORR activity of the carbon nanotube through increasing the charge delocalization which enhances the ability of the nitrogen doped carbon nanotube to bind oxygen molecules. This is another postulated mechanism for the higher ORR activity of the nitrogen doped carbon nanotubes over the undoped counterpart.

In one embodiment the core-shell bifunctional catalyst comprises nitrogen-doped carbon nanotubes (NCNT) as the shell and lanthanum nickelate ($LaNiO_3$) as the core.

In another embodiment the shell may further include an additive or filler agent.

Synthesis (Deposition) of Carbon Nanostructures

Synthesis of carbon nanostructures is known in the art and can be carried out in a number of ways including but not limited to chemical vapour deposition (CVD). The CVD may be by direct liquid injection or may be aerosol assisted CVD. The deposition of the carbon nanostructure may also be done by plasma enhanced CVD. These and other suitable methods know in the art such as hydrothermal methods may be used to prepare the carbon nanostructures of the shell of the core-shell bifunctional catalyst.

The carbon nanostructure may be deposited directly on the metal oxide that forms the core of the bifunctional catalyst. Deposition of the nanostructure on the core results in the carbon nanostructure being bound to the core. The metal oxide core may further serve as a support for the carbon nanostructure.

In a particular aspect the carbon nanostructure shell will cover sufficient surface area on the metal oxide core to provide for efficient catalysis of the oxygen reduction reaction while allowing sufficient access to the core to allow the metal oxide to catalyze the oxygen evolution reaction.

In a further aspect the catalyst is used as a bifunctional catalyst for a metal-air battery or metal air fuel cell. In still a further embodiment the metal air battery or metal air fuel cell operates under alkaline conditions. In yet a further embodiment, the metal air battery or fuel cell is zinc air, lithium air or aluminum air or the like.

The strategy of employing a bifunctional catalyst, having one of the oxygen reduction catalyst and the oxygen evolution catalyst, form the core, while the other forms the shell, allows a highly active oxygen reduction reaction catalyst and a highly active oxygen evolution reaction catalysts to be combined together and function as a whole to improve activity and stability.

In an embodiment of the invention the bifunctional catalyst having a core-shell structure comprises LaNiO3 particles as the core and support for the NCNT shell synthesized by means of chemical vapour deposition. The resultant CSBC was used as a bifunctional catalyst on the air cathode of zinc-air batteries. In a particular embodiment the size of the CSBC particles should be about no larger than 10 µm and about no smaller than 100 nm.

NCNT have been shown to have high oxygen reduction reaction activity and stability in alkaline conditions, compared with commercially available Pt/C catalyst, making them suitable for use as the oxygen reduction reaction catalyst shell material in a CSBC.

LaNiO3 has been shown to exhibit excellent oxygen evolution reaction activity. The LaNiO3 core, of the CSBC may serve two purposes in the catalyst structure: i) to act as the support material for NCNT synthesis, and ii) to participate in the formation of OER active core.

The following non-limiting examples are provided as illustrative of the invention.

EXAMPLES

Example A

Synthesis of Core-Shell Bifunctional Catalyst

Nitrogen doped carbon nanotubes and $LaNiO_3$ were selected as the oxygen reduction and oxygen evolution catalysts respectively.

Example A1

Synthesis of $LaNiO_3$

Lanthanum nickelate synthesis was carried out using an amorphous citric acid method. Lanthanum oxide ($La_2O_3$, Aldrich) 1 g, was dissolved in 5 mL of 6 M nitric acid ($HNO_3$, Fisher Scientific). Nickel nitrate ($Ni(NO_3)_2 \cdot 6H_2O$, Aldrich) 1.56 g, was dissolved in 20 mL deionized water. The two solutions were allowed to mix, then 4.25 g citric acid ($C_6H_8O_7$, Aldrich) and 2.86 g ethylene glycol ($C_2H_6O_2$, Aldrich) were added. The mixture was allowed to mix for 5 min. The pH value of the mixture was adjusted to 7-8 by dropwise addition of ammonium hydroxide ($NH_4OH$, Fisher Scientific). At near neutral pH, the temperature of the mixture was raised to 90° C. and left heating overnight. The clear gel (greenish-blue in colour) was charred at 250° C. for 2 h. The resulting material was collected and calcined in air at 600° C. for 4 h and then ground to obtain $LaNiO_3$ powder.

Example A2

Synthesis of Core-Shell Bifunctional Catalyst

The core-shell bifunctional catalyst synthesis was carried out using an injection chemical vapour deposition (CVD) method. In a 4 mL glass vial, 250 µL ethanol, 1.25 mg ferrocene ($C_{10}H_{10}Fe$, Aldrich), and 20 mg $LaNiO_3$ were mixed together by sonication. The mixture was deposited onto the interior of a small quartz tube (18 mm O.D., 100 mm length), which was then placed in the centre of a horizontal tube furnace. A precursor solution was prepared by dissolving ferrocene in ethylenediamine ($C_2H_8N_2$, Aldrich) at 2.5 wt % concentration, and this was loaded into a syringe. Synthesis was carried out under nitrogen protection at 100 standard cubic centimeters per minute (sccm) and 700° C. During synthesis, the precursor solution was injected into the tube furnace at 0.05 mLmin$^{-1}$. After synthesis was completed, the furnace was opened to air at 400° C. for 1 h. The resulting black powder was the core-shell bifunctional catalyst.

In this study, the volume of precursor solution used during synthesis was varied and the samples were given a code according to the Table 1.

TABLE 1

The CCBC catalysts synthesized using different amount of precursor solution.

| Volume of precursor solution used | Sample name |
| --- | --- |
| 0 mL | CCBC-0 |
| 0.1 mL | CCBC-0.1 |
| 1 mL | CCBC-1 |
| 2 mL | CCBC-2 |
| 4 mL | CCBC-4 |

Example A3

Material Characterization

Methods

Scanning electron microscopy (LEO FESEM 1530) and transmission electron microscopy (Philips CM300) were used to examine the morphology and surface structure of the CCBC-2. X-ray diffraction (Bruker AXS D8 Advance) was used to investigate the crystal structure of $LaNiO_3$ from 20-80 2θ. X-ray photoelectron spectroscopy (Thermal Scientific K-Alpha X-ray photoelectron spectroscopy (XPS) spectrometer) was used to investigate the type and relative composition of the surface nitrogen groups. Thermogravimetric analysis (TA Instruments, Q500) was used to determine the thermal stability and carbon content of the CCBC-2 by heating the sample in air to 600° C.

Figure 2:
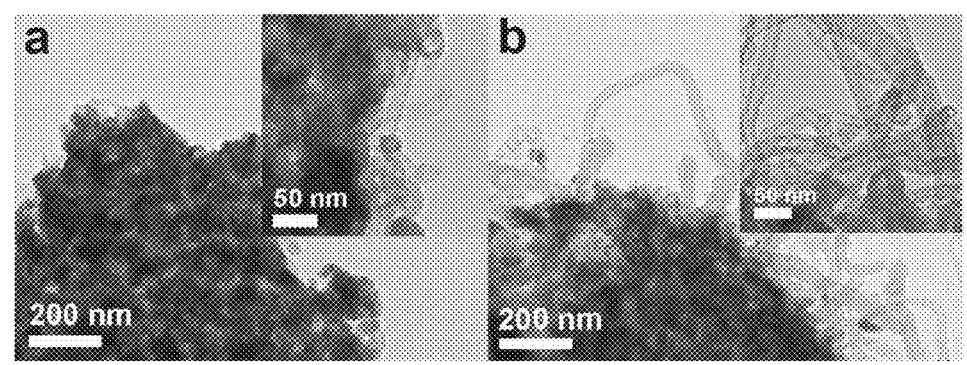
FIG. 2 a) shows a TEM image of CCBC-0.1 and b) shows a TEM image of CCBC-1.
Figure 3:
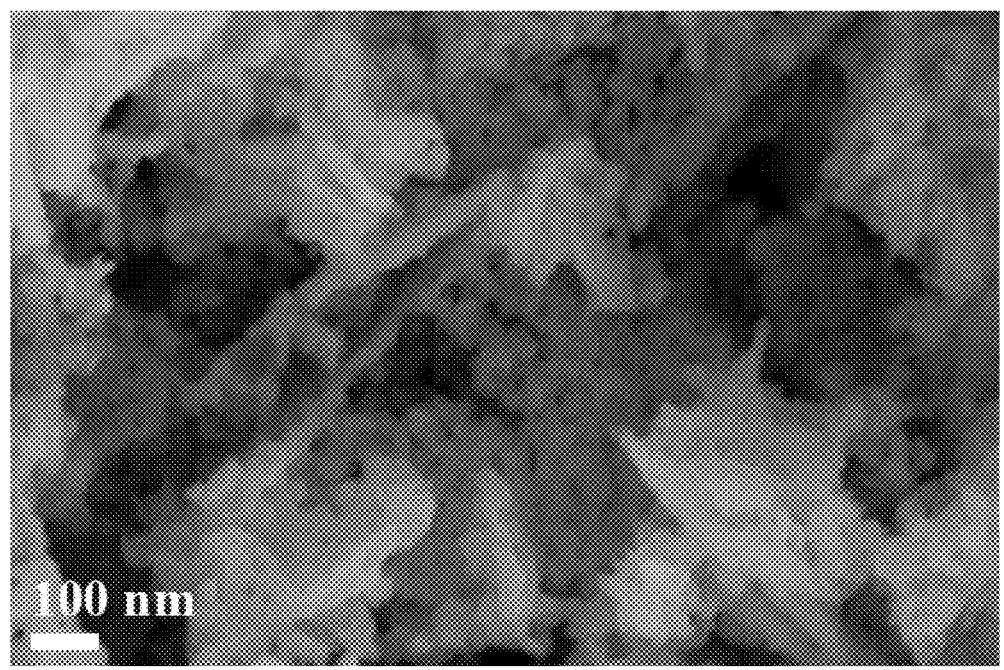
FIG. 3 shows a SEM image of LaNiO$_3$ synthesized using amorphous citrate method.

Scanning electron microscopy (SEM) and transmission electron microscopy (TEM) of the uniquely designed nanostructures confirmed the formation of carbon tubules (FIG. 1b) observed on the surface of CCBC to be NCNTs with a bamboo-like structure (FIG. 2). While FIG. 3 shows an SEM image of LaNiO3 synthesized using amorphous citrate method.

Figure 4:
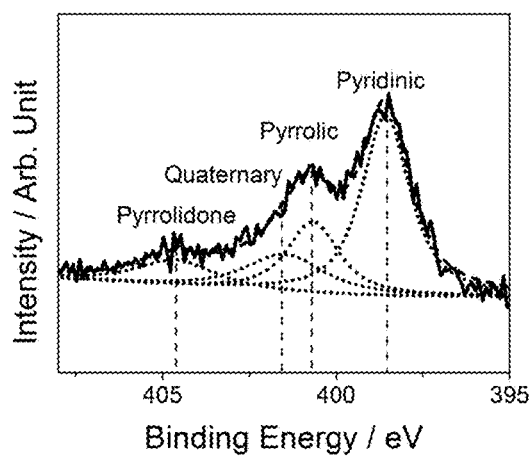
FIG. 4 shows a high resolution N 1s X-ray photoelectron spectroscopy (XPS) of the CCBC-2. The solid line represents the original signal, the dash line represents the result of fitting, and the dotted lines represent the peaks associated with different surface nitrogen groups as a result of deconvolution.

High resolution X-ray photoelectron spectroscopy (XPS) signals were obtained for the N1s spectrum which was de-convoluted into four contributions, the pyridinic, pyrrolic, quaternary and pyrrolidone nitrogen groups (FIG. 4). The binding energy of the surface nitrogen groups and the respective percentages are tabulated in Table 2 below. These observed surface nitrogen groups are consistent with previously reported data for nitrogen doped carbon materials.[7-19] Further, the binding energy of the surface nitrogen groups closely matches with previously reported data for nitrogen doped carbon material.[20] Based on XPS analysis, the pyridinic and pyrrolic nitrogen groups were found to be the most dominant surface nitrogen configurations. These surface nitrogen groups have been previously directly correlated to ORR activity and are desirable in high concentrations.[21, 8]

TABLE 2

Binding Energy and Relative Percentage
of Surface Nitrogen Groups of CCBC-2.

| Surface N group | Binding energy (eV) | Relative percentage (%) |
|---|---|---|
| Pyridinic | 398.6 | 49.6 |
| Pyrrolic | 400.7 | 21.5 |
| Quaternary | 401.5 | 17.3 |
| Pyrrolidone | 404.6 | 11.6 |

Figure 5:
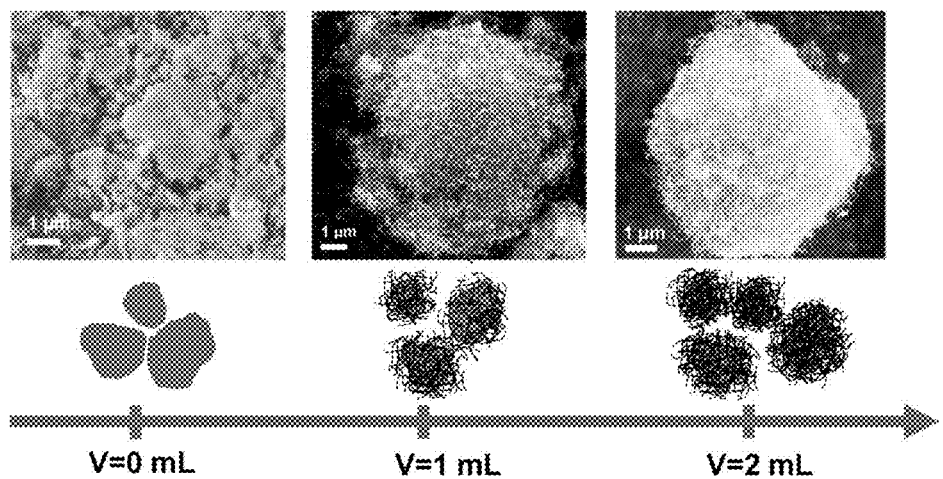
FIG. 5 shows a SEM of the general morphology of CCBC-0, CCBC-1 and CCBC-2.

To provide details on the growth of the NCNT corona structures, the synthesis of CCBC was interrupted at various stages of growth based on the amount of NCNT precursor material injected into the CVD system. When large volumes of precursor solution was injected into the system, long and dense forestation of NCNT on the surface of CCBC is evident from the comparison of SEM and TEM (see FIGS. 5 and 2). Utilizing smaller precursor volumes resulted in the formation of relatively shorted, sparse NCNT coverage (FIGS. 5 and 2). These results are in keeping with the hypothesis shown in the drawing in FIG. 5 indicating that the formation of the NCNT shell is expected to depend on the amount of precursor present. The SEM in FIG. 5 illustrates the general morphology of the CCBC-0, CCBC-1 and CCBC-2, and clearly shows the difference between CCBC-0 synthesized with no precursor showing no NCNT formation and CCBC-1 and CCBC-2 showing increasing amounts of NCNT formation.

To examine the NCNT formation in more detail, transmission electron microscopy (TEM) images of the CCBC-0.1 and CCBC-1 were compared. Based on FIG. 2, it is evident that the CCBC-1 contains longer and more dense NCNTs which formed into a corona around the core. This is in sharp contrast to CCBC-0.1, where short NCNTs were found to scatter around the core material. The clear difference in the NCNT corona formation of CCBC-0.1 and CCBC-1 reflects the initial hypothesis, regarding the structure of the CCBC catalyst.

Figure 6:
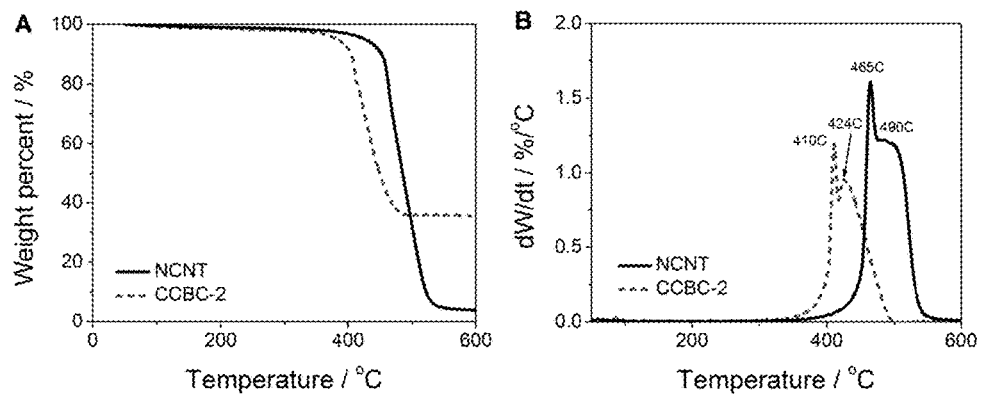
FIG. 6 shows a thermogravimetric analysis (TGA) of the CCBC-2 and nitrogen doped carbon nanotubes; a) shows a weight loss profile, and b) shows a differential thermogravimetric (DTG) profile.

Thermogravimetric analysis of CCBC-2 indicates that carbon and metal oxides constitutes 64.2 wt. % and 35.8 wt. % of the CCBC-2 catalyst, respectively (FIG. 6). The CCBC-2 and nitrogen-doped carbon nanotubes (NCNT) were heated in air to 600° C. and the weight loss profile was compared (FIG. 6). The onset temperatures of oxidation for the CCBC-2 and NCNT are ca. 345° C. and 375° C., respectively. The CCBC-2 retained ca. 35.8% of the original weight, which is significantly higher than the 4.19% retained by the NCNT. The shift in the weight loss profile indicates lowering of the oxidation temperature for the NCNT in the corona of the CCBC-2.

Example B

Electrocatalytic Activity and Stability of the Core-Shell Bifunctional Catalyst Relative to Pt/C and LaNiO3 catalysts Example B1

Half-Cell Test Conditions

The electrocatalytic activity and stability of the core-shell bifunctional catalyst and the Pt/C and LaNiO$_3$ samples were measured using rotating disc electrode (RDE) (also called rotating ring disc electrode (RDDE) voltammetry). The rotating ring disc electrode (RRDE) voltammetry, system consisted of a potentiostat (Pine Instrument Co., AFCBP-1) and a rotation speed controller (Pine Instrument Co., AFM-SRCE). The RRDE was used as the working electrode in a three-electrode cell system. The RRDE electrode consists of a glassy carbon electrode (5 mm OD) and a platinum ring electrode (99.99% Pt, 6.5 mm ID, 7.5 mm OD). Prior to RRDE voltammetry, 4 mg of bifunctional catalyst was suspended in 1 mL of 0.5 wt % Nafion solution. The resulting solution is referred to as the "catalyst ink" and was sonicated until excellent dispersion was achieved. For each RRDE experiment, 60 μL of catalyst ink was deposited onto the glassy carbon electrode and allowed to dry (loading of 1.22 mgcm-2). After the ink was dried, the electrode was visually inspected to ensure uniform film formation. The working electrode was immersed in a glass cell containing 0.1 M KOH (Caledon Lab Chemicals). A double junction Ag/AgCl and a platinum wire were inserted into the electrolyte to serve as the reference and counter electrodes, respectively. Catalyst activity towards the ORR was evaluated in O2-saturated electrolyte solution from 0.2 V to −1 V vs. Ag/AgCl. Four rotation speeds of 100 rpm, 400 rpm, 900 rpm, and 1600 rpm were used and the scan rate was 10 mVs$^{-1}$. The catalyst's activity towards oxygen evolution and its full-range stability were tested in N$_2$-saturated electrolyte solution from −1 V to 1 V vs. Ag/AgCl at a scan rate of 50 mVs$^{-1}$. The working electrode was rotated at 900 rpm during full-range stability testing. Commercial Pt/C catalyst (20 wt % platinum on carbon, BASF) and LaNiO$_3$ (synthesized in-house) were tested using the same procedure.

Example B2

Single-Cell Test Conditions

Figure 11:
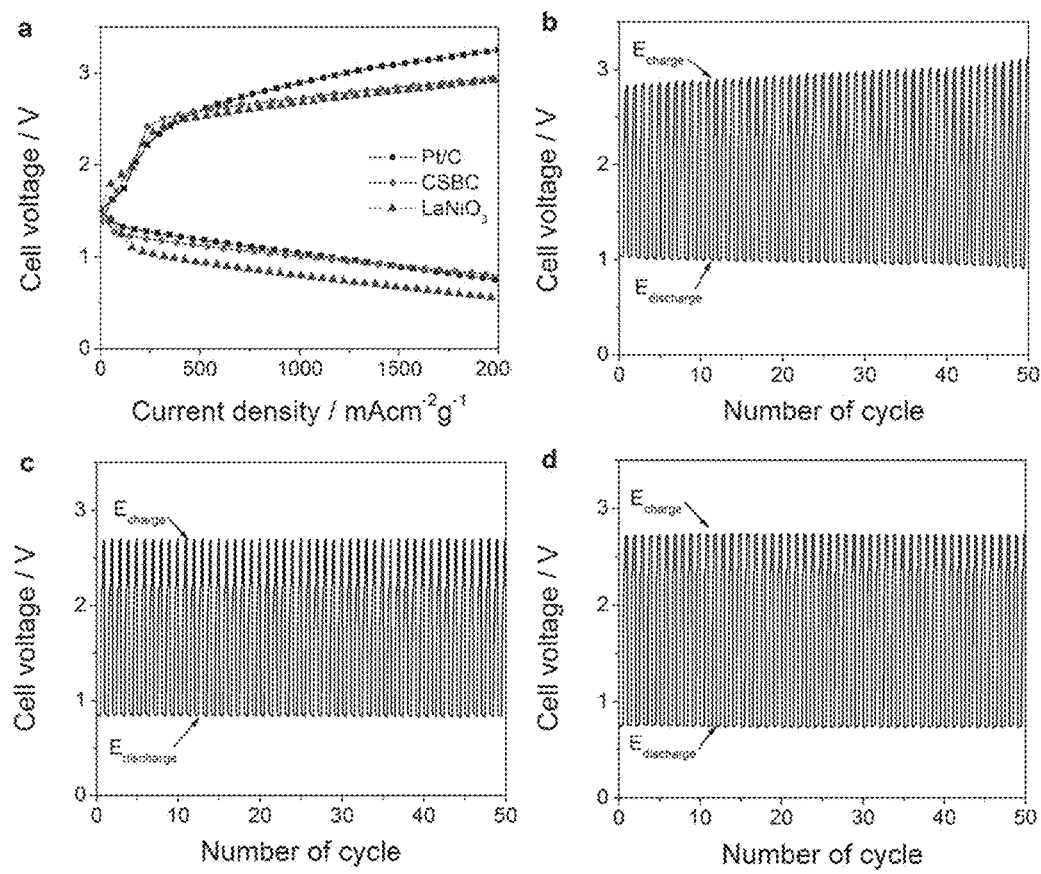
FIG. 11 shows the zinc-air battery performance of Pt/C, CSBC, and LaNiO$_3$; a) shows discharge and charge performance of Pt/C, CSBC (LaNiO$_3$—NCNT), and LaNiO$_3$ from 0 to 2000 mAcm$^{-2}$ g$^{-1}$; b) shows the charge discharge profile of Pt/C; c) shows the charge discharge profile of the CSBC (LaNiO$_3$—NCNT); and d) shows the charge discharge profile of LaNiO$_3$ at 50 mA.
Figure 12:
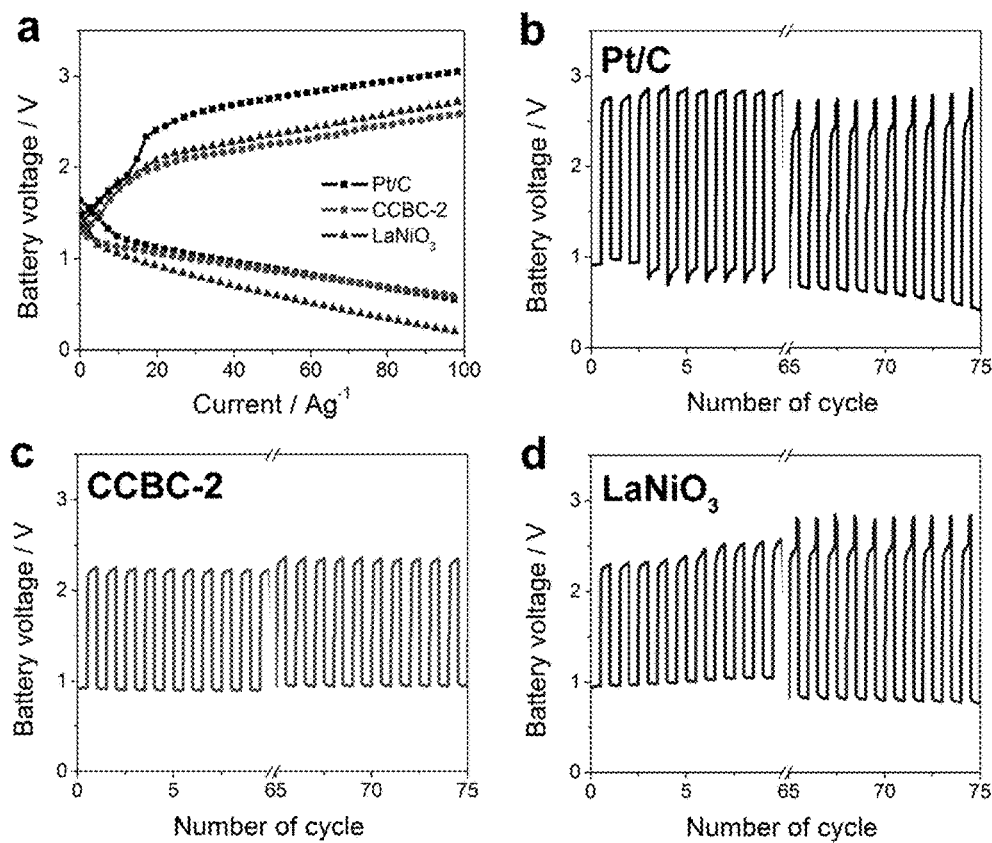
FIG. 12 shows the zinc-air battery performance of the Pt/C, CCBC-2 and LaNiO$_3$; a) shows discharge and charge polarization curves of Pt/C, CCBC-2 and LaNiO$_3$; b) shows the charge discharge profile of Pt/C; c) shows the charge discharge profile of CCBC-2 and d) shows the charge discharge profile of the LaNiO$_3$. One discharge and charge is referred to as one cycle, and the battery was cycled 75 times.
Figure 13:
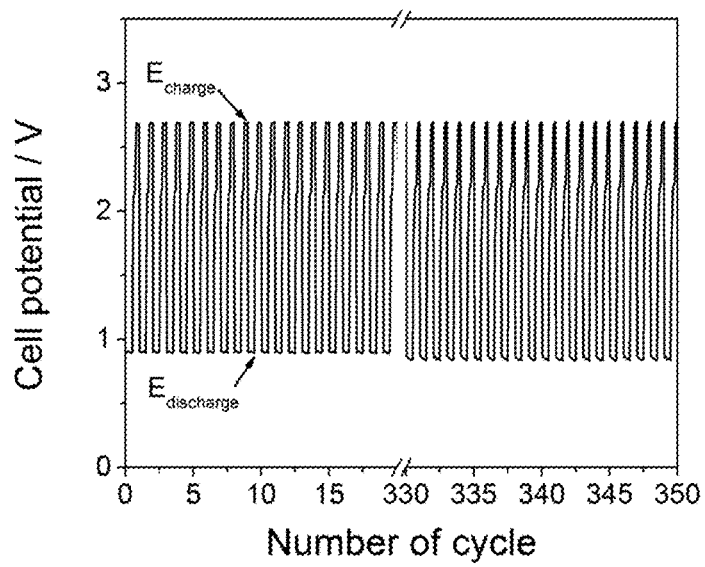
FIG. 13 shows the charge and discharge test of CSBC (LaNiO$_3$—NCNT) over 350 cycles. Over 350 cycles, the charge potential remained at 2.70 V and the discharge potential changed by 5% from 0.85 V to 0.83 V. The discharge/charge duration is the same as noted above for FIGS. 11 b), c) and d).
Figure 14:
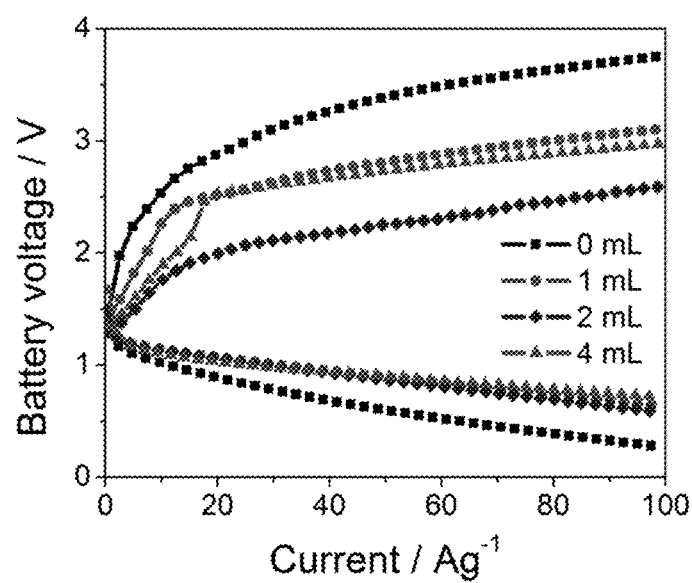
FIG. 14 shows charge and discharge polarization curves of CCBC-0, CCBC-1, CCBC-2 and CCBC-4.
Figure 15:
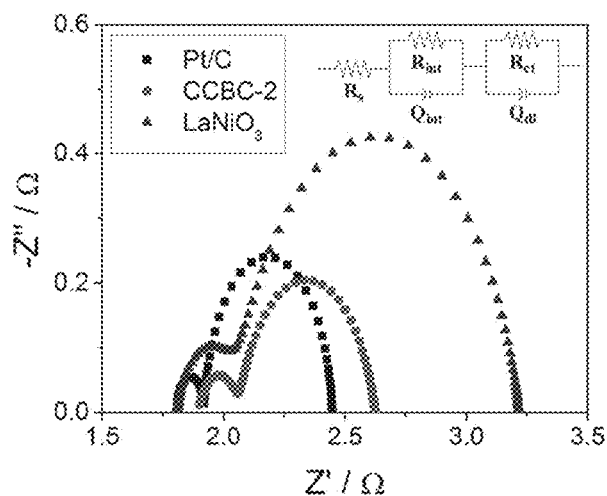
FIG. 15 shows the Nyquist plot constructed from the electrochemical impedance spectroscopy data of the Pt/C, CCBC-2 and LaNiO$_3$ prior to charge discharge cycling.
Figure 16:
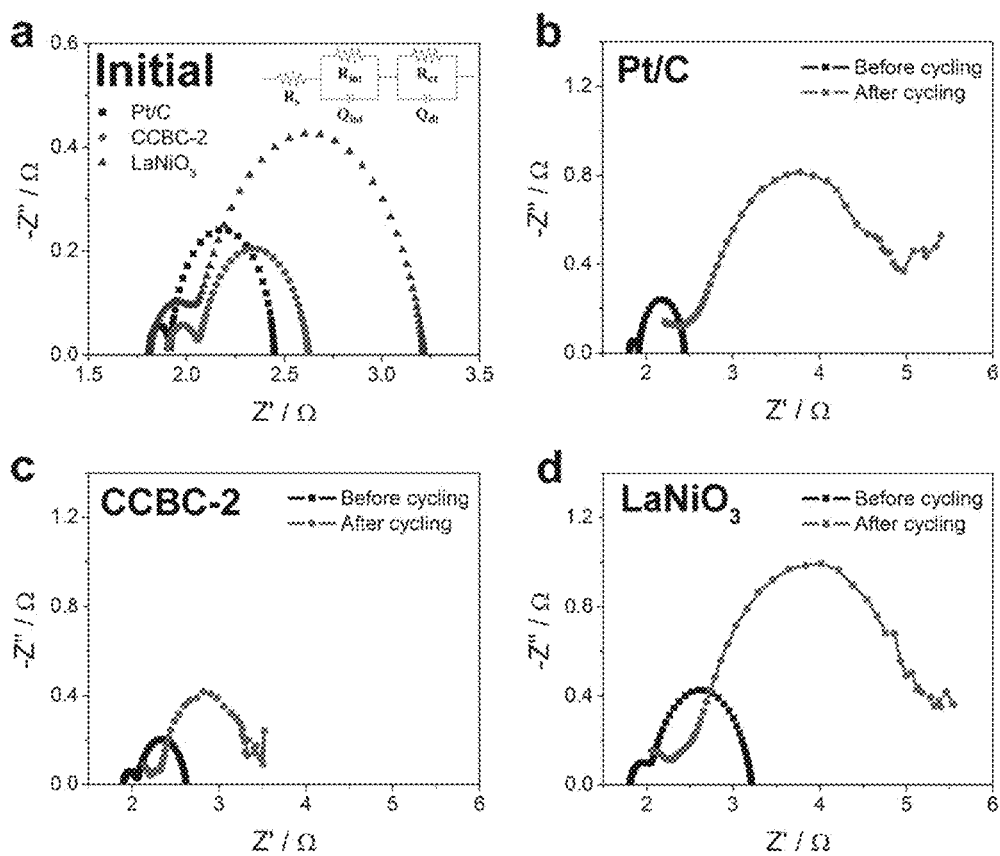
FIG. 16 shows electrochemical impedance spectroscopy of the zinc-air battery before and after cycling; a) initial Nyquist plot of Pt/C, CCBC-2 and LaNiO$_3$, the impedance data can be represented by the equivalent circuit shown; b) change in the Nyquist plot as a result of cycling for Pt/C; c) change in the Nyquist plot as a result of cycling for CCBC-2 and d) change in the Nyquist plot as a result of cycling for LaNiO$_3$.

Test Conditions A (Used in the Collection of Data Associated with FIGS. 11 and 13.)

The core-shell bifunctional catalyst was evaluated in a home-made zinc-air battery. A polished zinc plate and a piece of core-shell bifunctional catalyst coated gas diffusion layer (Ion Power Inc., SGL Carbon 10 BB, 2.5 cm by 2.5 cm) were used at the anode and cathode, respectively. The catalyst loading on the gas diffusion layer was 1.5 mg$_{catalyst}$ cm$^{-2}$ and the electrolyte used in the zinc-air battery was 6 M KOH. Discharge, charge as well as charge-discharge cycling were performed.

Test Conditions B (Used in the Collection of Data Associated with FIGS. 12, 14, 15 and 16.)

Figure 7:
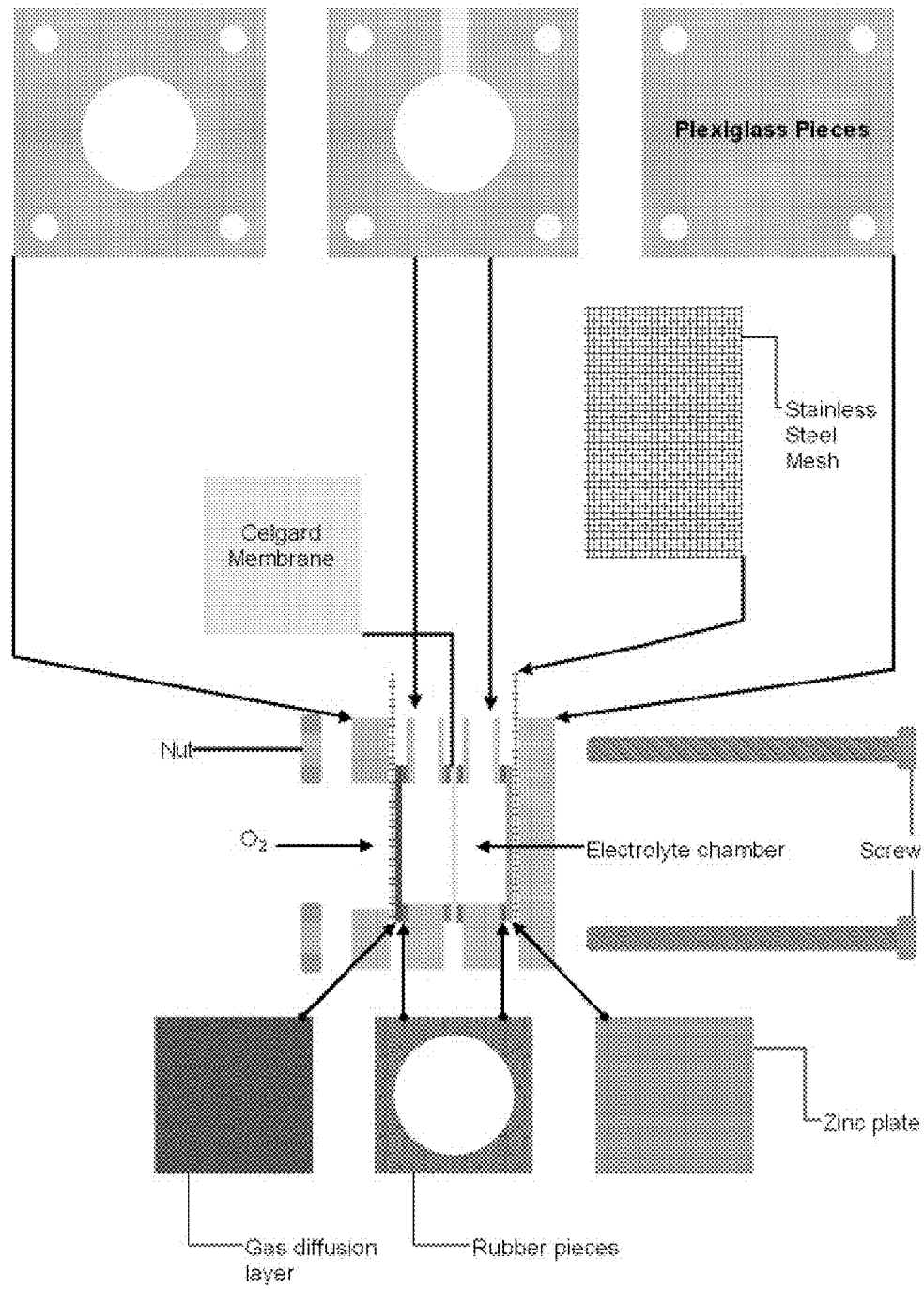
FIG. 7 shows a schematic of a home-made zinc air battery.

Single-cell testing of the catalyst was performed using a multichannel potentiostat (Princeton Applied Research, VersaSTAT MC) and a home-made zinc-air battery. A polished zinc plate and a piece of catalyst-coated gas diffusion layer (Ion Power Inc., SGL Carbon 10 BB, 2.5 cm by 2.5 cm) were used at the anode and cathode, respectively. Microporous membrane (25 μm polypropylene membrane, Celgard 5550) was used as a separator and stainless steel mesh was used as current collectors. The design and specification of the home-made zinc-air battery is shown in FIG. 7. The electrolyte used in the zinc-air battery was 6 M KOH. The concentration of the electrolyte was chose based on our previous study, where using 6 M KOH yielded the best battery performance. Based on the battery design, the actual area of the gas diffusion layer being exposed to the electrolyte is 2.84 cm$^2$. All the catalysts studied in this work were coated onto the gas diffusion layer using an airbrush to achieve a loading of ca. 0.72 mgcm$^{-2}$.

A galvanodynamic method was used to discharge and charge the battery to 98.0 Ag$^{-1}$. The potential difference between the cathode and the anode was determined to be the open circuit voltage. A charge-discharge experiment was performed by discharging or charging (300 s in each state) of the battery at 50 mA (or ca. 24.5 Ag$^{-1}$) using recurrent galvanic pulses method. Electrochemical impedance spectroscopy was performed from 100 kHz to 0.1 Hz with AC amplitude of 10 mV. Beside the CCBC-2, Pt/C and LaNiO$_3$ electrode were also evaluated using the same methodology.

Results and Discussion

Half-cell testing was employed to evaluate the ORR and OER activities of the CCBC-2. Comparison of ORR and OER activity was made with commercial Pt/C and LaNiO3, respectively, as these materials are known in the art to be high performing catalyst materials towards the respective reactions.[10, 22, 23] Excellent ORR activity was demonstrated by the CCBC-2, where the half-wave potential and ORR current density is very similar to the commercial Pt/C. In comparison to the LaNiO$_3$, CCBC-2 illustrates 5.8 times higher ORR current density at −0.5 V and a 200 mV improvement in half-wave potential. The much higher ORR performance of CCBC-2 over LaNiO$_3$ suggests that the NCNT corona is responsible for the ORR activity of CCBC-2.

Figure 8:
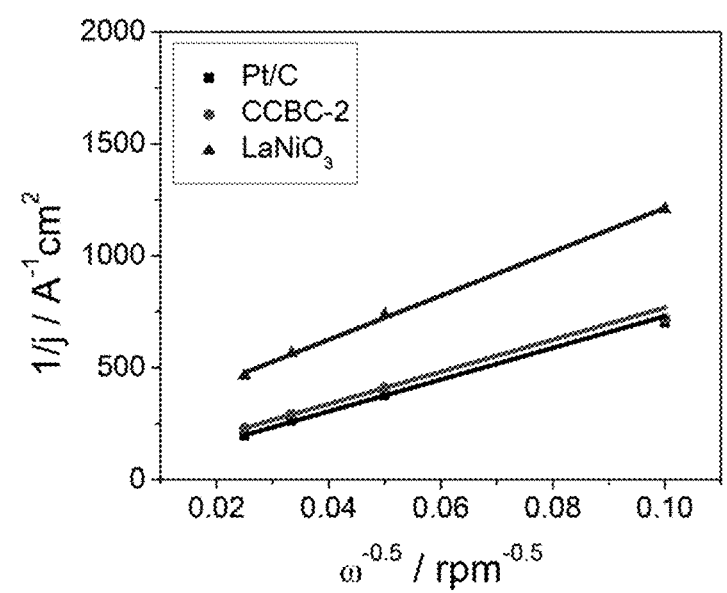
FIG. 8 shows a Koutecky-Levich plot of the Pt/C, CCBC-2 and LaNiO$_3$ catalysts at −0.5 V vs. Ag/AgCl.

The number of electrons transfer during ORR is calculated for CCBC-2 and LaNiO$_3$ using the Koutecky-Levich equation (FIG. 8). Koutecky-Levich equation relates the observed current density (j) with the kinetic current (j$_K$) and limiting current density (j$_L$) through the Levich slope (B) and electrode rotation speed (ω). From this relationship, the number of electrons transferred (n) can be calculated using the following equation, $$\frac{1}{j} = \frac{1}{j_K} + \frac{1}{j_L}$$

$$j_L = B\omega^{\frac{1}{2}}$$

The Levich slope can be further defined as, $$B = 0.2nFD_o^{\frac{2}{3}} C_o v^{-\frac{1}{6}}$$

In the above equation, F is the Faraday constant, D$_o$ is the diffusion coefficient of O$_2$ (1.9×10$^{-5}$ cm$^2$/s), C$_o$ is the concentration of O$_2$ in the electrolyte (1.1×10$^{-6}$ mol/cm$^3$) and u is the kinematic viscosity of the solution (0.01 cm$^2$/s)$^3$. The Koutecky-Levich plot of the commercial Pt/C, CCBC-2, and LaNiO$_3$ at −0.5 V is showed in FIG. S12. The number of electrons transferred at −0.5 V is 4.0, 4.0 and 2.9 for Pt/C, CCBC-2 and LaNiO$_3$ respectively.

The number of electrons transferred at different potentials of the catalysts investigated in this work is summarized in the following table.

TABLE 3

The number of electrons transferred at different potentials for the Pt/C, CCBC-2 and LaNiO$_3$ catalysts based on half cell test.

| | Number of electrons transferred (n) | | |
|---|---|---|---|
| | Pt/C | CCBC-2 | LaNiO$_3$ |
| −0.30 V | 4.0 | 4.0 | 2.7 |
| −0.35 V | 4.0 | 4.0 | 3.2 |
| −0.40 V | 4.0 | 4.0 | 3.2 |
| −0.45 V | 4.0 | 3.8 | 3.1 |
| −0.50 V | 4.0 | 4.0 | 2.9 |

The CCBC-2 catalyst demonstrates a four-electron reduction of oxygen, significantly more efficient compared to the two-electron reduction determined for LaNiO$_3$. The oxygen reduction reaction (ORR) occurring by a more efficient pathway indicates the impact of the NCNT corona on the overall activity of the CCBC-2 catalyst. Apart from high ORR activity, high oxygen evolution reaction (OER) activity is another characteristic of bifunctional catalyst materials. Despite a much lower overall composition of the core LaNiO3 material, the initial OER current density of the CCBC-2 is comparable with LaNiO$_3$ at 1 V vs. Ag/AgCl (FIGS. 9d and 9e) indicating exemplary OER kinetics.

While ORR and OER activity are important parameters for the development of bifunctional catalyst materials, catalyst stability is also critical for practical applications. To investigate this, full-range degradation testing (FDT) was performed using cyclic voltammetry in the range of −1 to 1 V vs Ag/AgCl on catalyst samples (FIG. 9c-9e). The commercial Pt/C catalyst suffered from significant performance degradation after FDT (FIGS. 9b and 9c), whereas CCBC-2 demonstrated excellent stability exhibiting 3 and 13 times higher ORR and OER current density, respectively, following FDT. Under the high potentials incurred during FDT, Pt/C degradation could occur via particle agglomeration, dissolution, surface oxide formation or detachment from the carbon support due to corrosion. Based on the CV profile of Pt/C, a significant decrease in capacitive current and the disappearance of hydrogen adsorption/desorption peaks suggest dramatic changes to the catalyst surface structures, most likely according to the aforementioned degradation mechanisms. In sharp contrast, the CCBC-2 is durable under continuous cycling, which is apparent from the stable CV profile (FIG. 9).

Figure 9:
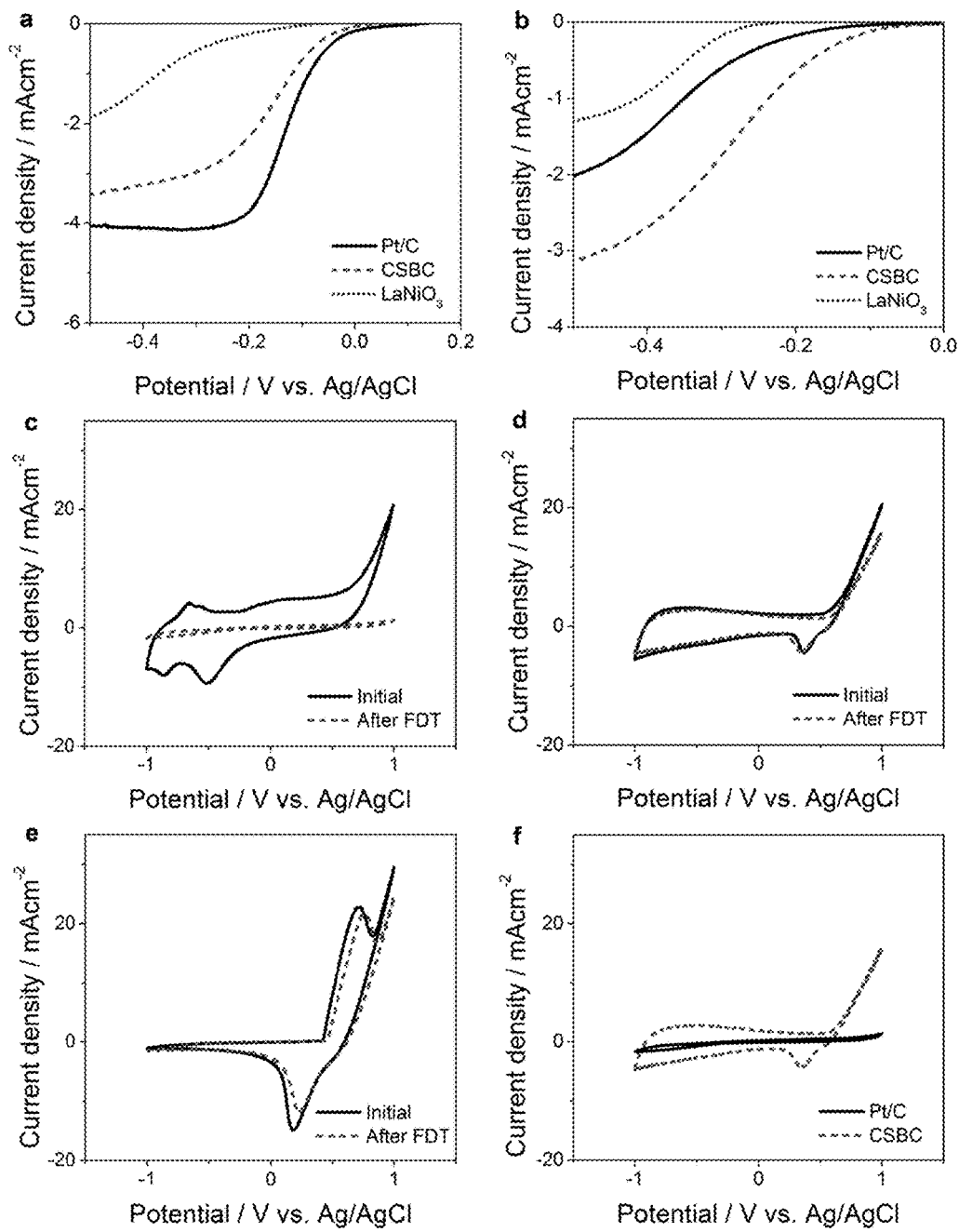
FIG. 9 shows the half-cell performance of Pt/C, CSBC (LaNiO$_3$—NCNT), and LaNiO$_3$ measured by a ring disc electrode system under various conditions; a) shows ORR polarization curves of Pt/C, CSBC, and LaNiO$_3$ before full range degradation testing (FDT); b) shows ORR polarization curves of Pt/C, CSBC, and LaNiO$_3$ after FDT; c) shows the cyclic voltammogram representing the capacitive current and the OER performance of Pt/C, d) shows the cyclic voltammogram representing the capacitive current and the OER performance of CSBC; e) shows the cyclic voltammogram representing the capacitive current and the OER performance of LaNiO$_3$ and f) shows a comparison of the cyclic voltammogram that represents the capacitive current and the OER performance of Pt/C and the CSBC after FDT.

FIG. 9 shows the dominant oxygen reduction reaction (ORR) activity of the nitrogen doped carbon nanotube (NCNT) shell as illustrated through comparison with LaNiO3, where 6 times higher ORR current density was observed. The ORR and oxygen evolution reaction (OER) current densities of the core-shell bifunctional catalyst decreased by 42.7% and 22.9%, respectively, whereas Pt/C suffered a much higher activity loss of 84.9% and 94.1% towards the ORR and OER, respectively.

During battery charging, the bifunctional catalyst materials will be exposed to very high electrode potentials during the OER, which is conducive to surface oxidation and degradation. Thus, retaining ORR activity after experiencing these elevated potentials is a significant challenge facing bifunctional catalyst materials, primarily those composed of carbon. Despite these high potentials encountered during FDT, CCBC-2 retained its high activity. This indicates that the oxidation of the NCNT materials was not prevalent and that the core-corona structure potentially improves the overall stability of the catalyst. While not wishing to be bound by theory a synergistic effect could exist between the core material and the NCNT corona of the CCBC-2, where the enhanced stability of the NCNT corona could be influenced by the core material assisting in the prevention of carbon corrosion.

Figure 10:
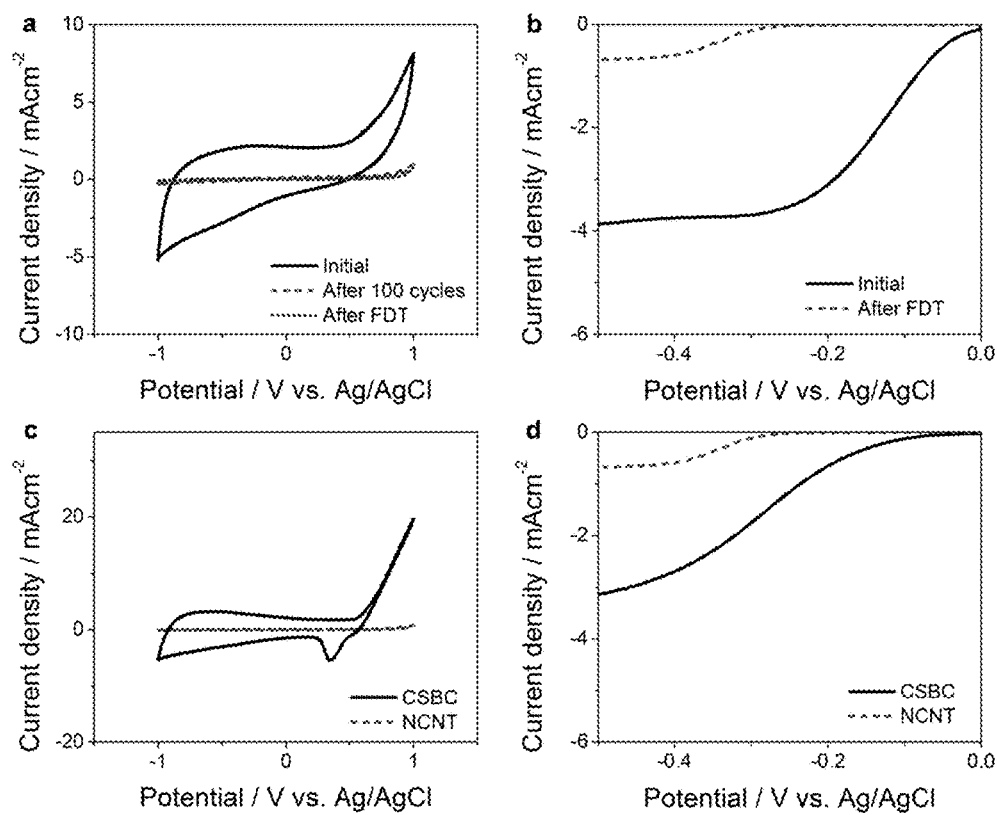
FIG. 10 shows the ORR and OER performance of NCNT compared with CSBC (LaNiO$_3$—NCNT); a) shows the cyclic voltammogram representing the capacitive current and the OER performance of the NCNT before, 100 cycles after and 500 cycles after FDT; b) shows ORR polarization curve of NCNT before and after FDT; c) shows the comparison of the cyclic voltammogram that represents the capacitive current and the OER performance of OER activity of CSBC and NCNT after FDT and d) comparison between the ORR activity of CSBC (LaNiO$_3$—NCNT) and NCNT after FDT.

In a further experiment, a comparison between the core-shell bifunctional catalyst of Example A and nitrogen doped carbon nanotube (NCNT) were carried out to illustrate the synergistic effect between the core and shell portion of the core-shell structure. FIG. 10 shows the fast diminishing capacitive current and activity of pure NCNT towards the oxygen evolution reaction (OER) demonstrating that the core material in the core-shell bifunctional catalyst exhibits dominant OER activity.

Reduction in carbon corrosion by LaNiO3 and other metal oxides have been documented by others.24 It is believed that this theory may be applicable to nitrogen doped carbon materials, in this case the NCNT corona. The enhanced stability of the NCNT corona could be caused by the core material assisting in the prevention of carbon corrosion. The ORR and OER current density of NCNT at −0.3 V and 1 V decreased by 96.7 and 89.1% respectively. Whereas, the CCBC-2 catalyst demonstrated significantly less decrease in the ORR and OER current density as apparent from FIGS. 10c and 10d. Approximately 22 times lower OER current density compared with the CCBC-2 was observed after 100 cycles of the FDT. Similarly, the ORR current density of the NCNT is 14 times lower compared with the CCBC-2 after 500 cycles.

From the initial ORR activity of NCNT, the onset, half-wave potential and limiting current density is approximately 0 V, −0.128 V and −3.98 mAcm-2 respectively. In the case of CCBC-2 where NCNT content is approximately 64.2 wt. %, the onset, half-wave potential and limiting current density is approximately 0 V, −0.162 V and −3.41 mAcm-2 respectively. This indicates the effect of NCNT loading towards ORR. Consequently, given the same catalyst loading, a lower ORR-active NCNT loading would occur. Thus, lower ORR current density compared with Pt/C could be expected.

Table 4 shows the summary of the half-cell test results from Pt/C, CSBC and LaNiO3. JORR and JOER represent the ORR and OER current densities, respectively. Potentials were measured versus an Ag/AgCl reference electrode. All the ORR/OER performances after the FDT were measured after 500 cycles, unless indicated by '*', in which case the measurements were taken after 100 cycles.

TABLE 4

Half-Cell Test Results From Pt/c, CSBC and LaNiO3

|  | Before FDT | | After FDT | |
| --- | --- | --- | --- | --- |
|  | $J_{ORR}/$ mAcm$^{-2}$ (at −0.3 V) | $J_{OER}/$ mAcm$^{-2}$ (at 1 V) | $J_{ORR}/$ mAcm$^{-2}$ (at −0.3 V) | $J_{OER}/$ mAcm$^{-2}$ (at 1 V) |
| Pt/C | −4.12 | 20.7 | −0.62 | 1.22 |
| CSBC | −3.00 | 20.5 | −1.77 | 19.6* and 15.8 |
| LaNiO3 | −0.52 | 29.5 | −0.18 | 24.4 |
| NCNT | −3.67 | 8.14 | −0.11 | 0.89* |

Building on the promising half-cell performance, a metal-air battery adopting a zinc electrode was used to evaluate the catalyst's performance under realistic operating conditions. In this study CCBC-2 was compared to the Pt/C and LaNiO$_3$ for discharge and charge performance respectively (FIG. 12a). The CCBC-2 catalyst demonstrated similar discharge and charge current compared to Pt/C and LaNiO$_3$ indicating that its performance is close to the benchmark materials in ORR and OER. Concurrently, CCBC-2 demonstrated 1.5 times in charge current compared to Pt/C and 1 time higher discharge current compared to LaNiO3. These results indicate bifunctional activity of CCBC-2, which is an advantage with regards to catalyst stability during battery cycling.

A summary of the battery test results from Pt/C, CCBC-2, and LaNiO$_3$ is provided in Table 5. $E_{OCV}$ denotes open circuit potential. $I_{discharge}$ and $I_{charge}$ represent the mass specific discharge and charge current densities obtained at 0.8 V and 2 V, respectively.

TABLE 5

Battery Test Results From Pt/C, CCBC-2 and LaNiO$_3$

|  | $E_{OCV}$/V | $I_{discharge}$/Ag$^{-1}$ | $I_{charge}$/Ag$^{-1}$ |
| --- | --- | --- | --- |
| Pt/C | 1.48 | 62.0 | 13.3 |
| CCBC-2 | 1.45 | 60.5 | 20.2 |
| LaNiO$_3$ | 1.45 | 29.4 | 17.2 |

The rechargeability of the CCBC-2 catalyst was evaluated by charge-discharge (C-D) cycling experiments (FIG. 12b-12d). For an active bifunctional catalyst, low charge potential ($E_{charge}$), high discharge potential (Edischarge) and minimal fluctuation of these are required for good rechargeability. After charge-discharge cycling, the E-discharge of CCBC-2 remained unchanged after 75 cycles. In contrast, Pt/C and LaNiO3 suffered a 20 and 56% decrease in Edischarge, respectively. With respect to battery charge, CCBC-2 shows approximately 22% lower Echarge compared to Pt/C and LaNiO3 after C-D cycling. The cycling performance further illustrates the potential of the CCBC catalyst for rechargeable metal-air battery application.

FIG. 13 shows that charge-discharge cycling of core-shell bifunctional catalyst illustrated a very small change in the charge and discharge potentials after 350 cycles.

TABLE 6

The Initial and Final Value of the $E_{discharge}$ and $E_{charge}$ of Pt/C, CCBC-2 and LaNiO$_3$.

|  | Initial | After |
| --- | --- | --- |
|  | Pt/C | |
| $E_{discharge}$ | 0.95 | 0.42 |
| $E_{charge}$ | 2.75 | 2.86 |
|  | CCBC-2 | |
| $E_{discharge}$ | 0.93 | 0.94 |
| $E_{charge}$ | 2.23 | 2.33 |
|  | LaNiO$_3$ | |
| $E_{discharge}$ | 0.94 | 0.75 |
| $E_{charge}$ | 2.30 | 2.85 |

Additionally, FIG. 11 shows that the core-shell bifunctional catalyst showed excellent battery performance compared with Pt/C, which exhibited 54% higher mass specific current density during battery charge and very comparable current density during battery discharge. Compared with LaNiO$_3$, a 111% higher mass specific current density was observed during battery discharge and a similar current density was observed for charging. Moreover, the potentials during charge-discharge cycle showed no change for the core-shell bifunctional catalyst over 50 cycles, whereas increasing charge potential (11%) and decreasing discharge potential (14%) were observed for Pt/C.

Comparison of CCBC-0, CCBC-1, CCBC-2 and CCBC-4 battery performance showed significant impact of the morphology of the NCNT corona on the battery performance. Based on the charge discharge polarizations in FIG. 14, the CCBC-2 showed the best performance.

In order to understand the high stability of the CCBC catalyst, electrochemical impedance spectroscopy was performed. The impedance data is fitted using an equivalent circuit (FIG. 15) and the values of fitted parameters are reported in Table 7. Nyquist plots (FIG. 16) reveals that the charge transfer resistance (Rct) value CCBC-2 is similar to Pt/C and 52% lower compared to LaNiO3. Thus the smaller Rct values of CCBC-2 compared with LaNiO3 is a strong indication of the improvement in ORR kinetics. The value of Rct increased by approximately 2 and 4 times for the Pt/C and LaNiO3 after cycling, respectively, which is significantly larger in comparison to CCBC-2. While not wishing to be bound by theory it is thought that the difference in the Rct could be a partial reason of the high stability observed for CCBC-2.

TABLE 7

Summary of the Equivalent Circuit Elements Resulting from Fitting the Impedance Data of Pt/C, CCBC-2 and LaNiO$_3$.

|  | Pt/C | CCBC-2 | LaNiO$_3$ |
| --- | --- | --- | --- |
| $R_s$ ($\Omega$) | 1.81 | 1.89 | 1.81 |
| $R_{int}$ ($\Omega$) | 0.110 | 0.168 | 0.242 |
| $R_{ct}$ ($\Omega$) | 0.531 | 0.562 | 1.17 |
| $Q_{int}$ (S · s$^n$) | $2.11 \times 10^{-4}$ | $3.58 \times 10^{-2}$ | $1.36 \times 10^{-3}$ |
| $Q_{dl}$ (S · s$^n$) | $8.57 \times 10^{-2}$ | $5.45 \times 10^{-4}$ | $2.50 \times 10^{-2}$ |

Experiment C

Comparison of Carbon Nanotube Catalysts

High activity and stability for oxygen reduction and evolution reactions are preferable in a metal air battery or fuel cell catalyst. For oxygen reduction reaction, onset potential, half wave potential and limiting current density are very important. For oxygen evolution reaction, the ability to achieve high current density and retain such current density is important. These experiments test the effectiveness of a variety of catalysts comprising as oxygen reduction reaction catalysts and oxygen evolution reaction catalysts.

| Catalyst | Oxygen reduction reaction | Oxygen reduction and evolution reactions |
| --- | --- | --- |
| CNT | Yes | No |
| BCNT | Yes | No |
| NCNT | Yes | No |
| LaNiO$_3$-CNT | Yes | Yes |
| CCBC | Yes | Yes |

Figure 17:
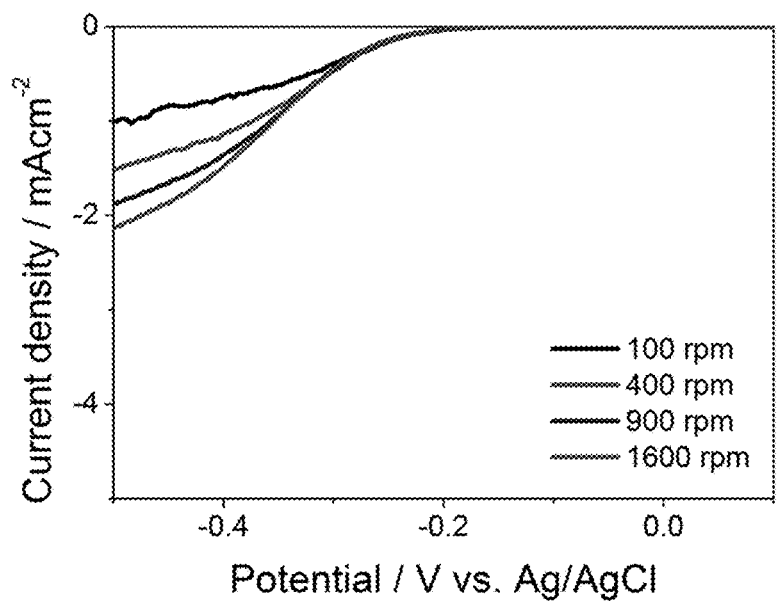
FIG. 17 shows ORR polarization curves for a carbon nanotube (CNT) catalyst.
Figure 18:
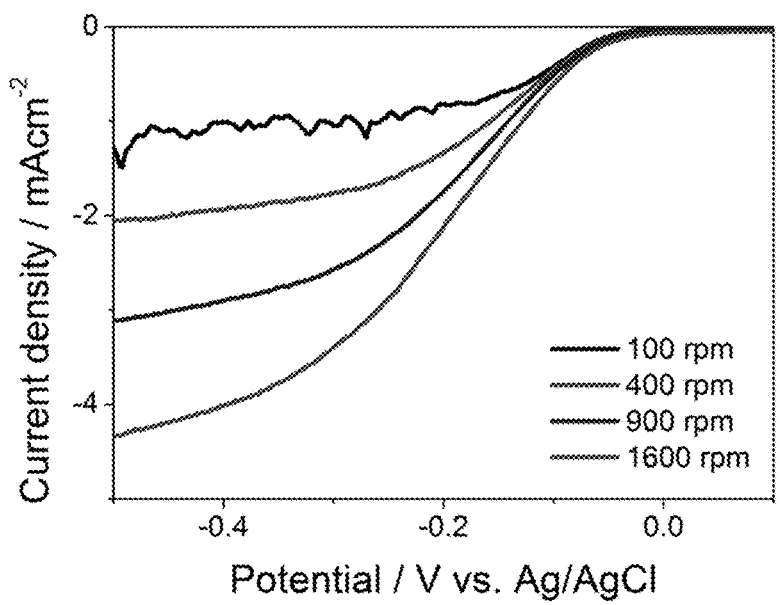
FIG. 18 shows ORR polarization curves for a boron doped carbon nanotube (BCNT) catalyst.
Figure 19:
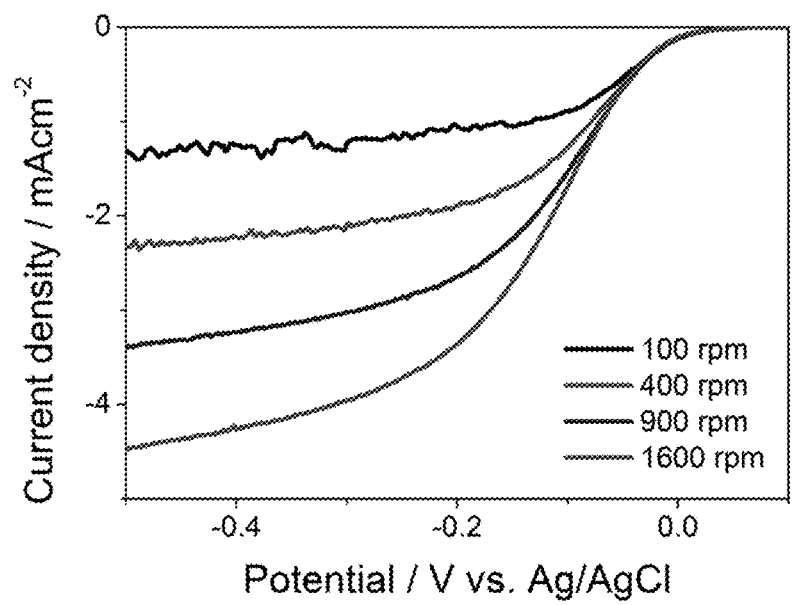
FIG. 19 shows ORR polarization curves for a nitrogen doped carbon nanotube (NCNT) catalyst.

The oxygen reduction reaction (ORR) polarization curves shown in FIGS. 17-19 are obtained employing the rotating ring disk electrode voltammetry technique in a half cell setup. The experiment is performed in O$_2$ saturated 0.1 M potassium hydroxide electrolyte. The background signal of the experiments was corrected by subtraction of the capacitive current recorded in nitrogen saturated electrolyte.

FIG. 17 shows ORR polarization curves for a carbon nanotube (CNT) catalyst with no doping. The onset potential which describes the commencing of oxygen reaction is −0.2 V vs. Ag/AgCl. The current density at −0.5 V vs. Ag/AgCl is −1.86 mAcm$^{-2}$ for the polarization curve obtained under 900 rpm rotation. By setting the current density at −0.5 V as the limiting current, the half wave potential is determined to be −0.35 V vs. Ag/AgCl.

FIG. 18 shows ORR polarization curves for a boron doped carbon nanotube (BCNT) catalyst. The onset potential which describes the commencing of oxygen reaction is −0.05 V vs. Ag/AgCl. The current density at −0.5 V vs. Ag/AgCl is −3.11 mAcm$^{-2}$ for the polarization curve obtained under 900 rpm rotation. By setting the current density at −0.5 V as the limiting current, the half wave potential is determined to be −0.18 V vs. Ag/AgCl.

FIG. 19 shows ORR polarization curves for nitrogen doped carbon nanotube (NCNT) catalyst. The onset potential which describes the commencing of oxygen reaction is 0.01 V vs. Ag/AgCl. The current density at −0.5 V vs. Ag/AgCl is −3.37 mAcm-2 for the polarization curve obtained under 900 rpm rotation. By setting the current density at −0.5 V as the limiting current, the half wave potential is determined to be −0.11 V vs. Ag/AgCl.

Figure 20:
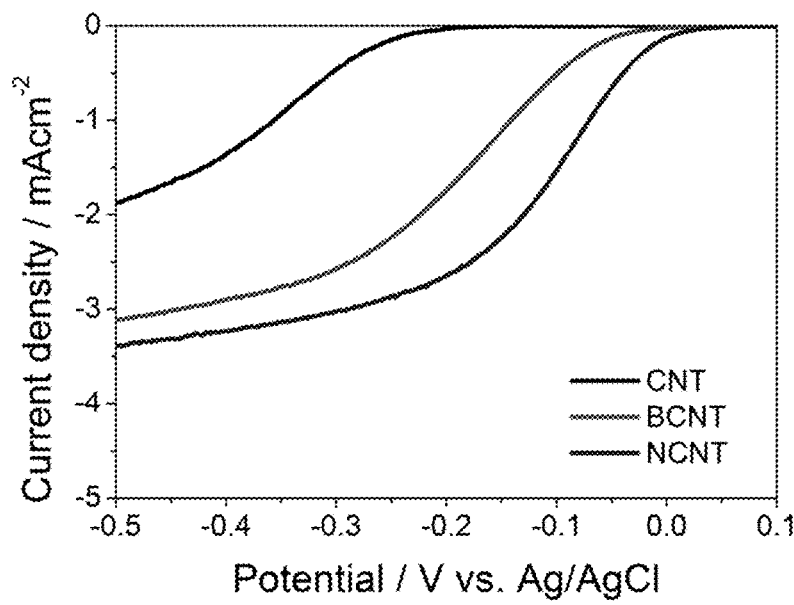
FIG. 20 shows ORR polarization curves for three carbon nanotube based catalysts, CNT, BCNT, NCNT.

The ORR polarization curves shown in FIG. 20 are obtained employing the rotating ring disk electrode voltammetry technique in a half cell setup. The experiment is performed in O2 saturated 0.1 M potassium hydroxide electrolyte. The background signal of the experiments was corrected by subtraction of the capacitive current recorded in nitrogen saturated electrolyte. The polarization curves illustrate the reduction of oxygen by the catalyst coated working electrode under 900 rpm rotation. Three parameters, onset potential, half wave potential and limiting current density are commonly used to evaluate the catalyst activity towards oxygen reduction reaction. The onset potential indicates the commencing of the reduction reaction; the half wave potential measures the potential at 50% of limiting current density, which represents the highest current density achievable at certain electrode rotation speed. The value of these parameters is shown in Table 8 below. The NCNT shows superior performance in every parameter investigated indicating its potential as electrocatalyst for oxygen reduction reaction.

TABLE 8

|  | CNT | BCNT | NCNT |
| --- | --- | --- | --- |
| Onset potential (V) | −0.2 | −0.05 | 0.01 |
| Half wave potential (V) | −0.35 | −0.18 | −0.11 |
| Limiting current density (mAcm$^{-2}$) | −1.86 | −3.11 | −3.37 |

Figure 21:
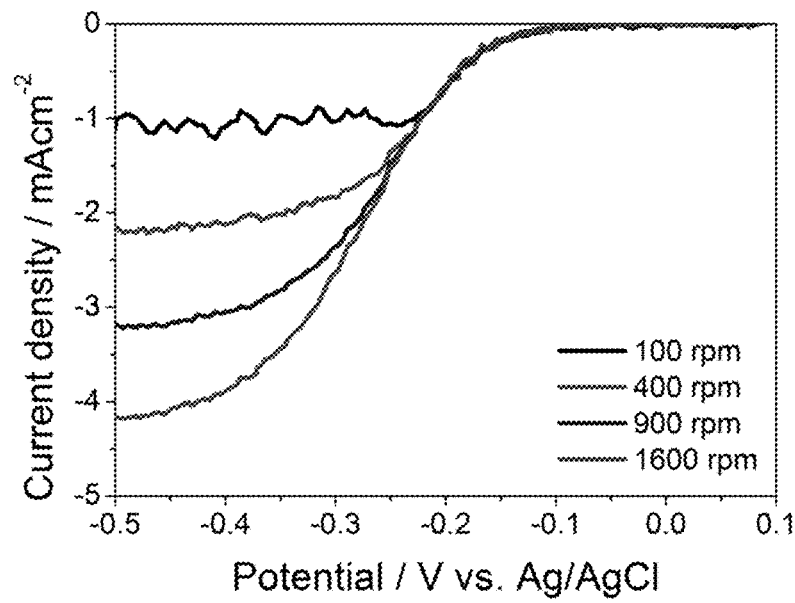
FIG. 21 shows ORR polarization curves for LaNiO$_3$—CNT bifunctional catalyst.

FIG. 21 shows oxygen reduction reaction polarization curves for a bifunctional catalyst comprising a LaNiO$_3$ core and a carbon nanotube shell with no doping. The ORR polarization curves are obtained employing the rotating ring disk electrode voltammetry technique in a half cell setup. The experiment is performed in O$_2$ saturated 0.1 M potassium hydroxide electrolyte. The background signal of the experiments was corrected by subtraction of the capacitive current recorded in nitrogen saturated electrolyte. The onset potential which describes the commencing of oxygen reaction is −0.12 V vs. Ag/AgCl. The current density at −0.5 V vs. Ag/AgCl is −3.21 mAcm$^{-2}$ for the polarization curve obtained under 900 rpm rotation. By setting the current density at −0.5 V as the limiting current, the half wave potential is determined to be −0.25 V vs. Ag/AgCl.

Figure 22:
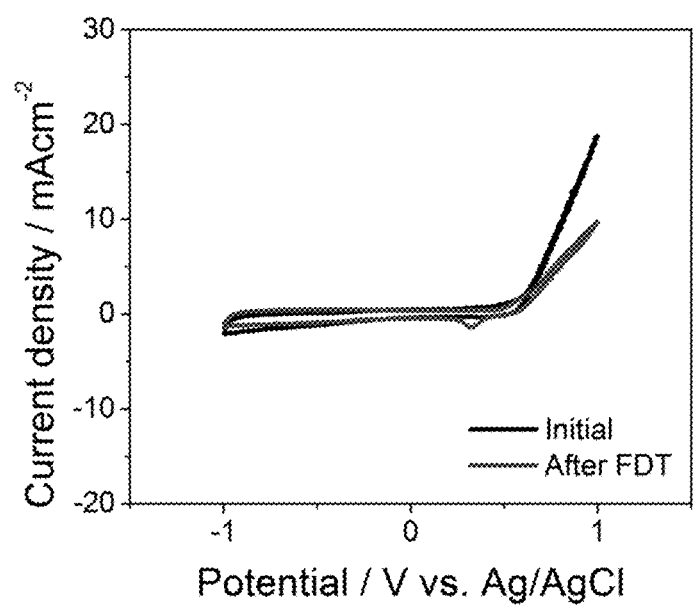
FIG. 22 shows the cyclic voltammogram representing the capacitive current and the OER performance of a LaNiO$_3$—CNT catalyst before and after FDT.

FIG. 22 shows the cyclic voltammograms for a $LaNiO_3$—CNT catalyst before and after full range degradation test. The full range degradation plots are obtained employing the rotating ring disk electrode voltammetry technique in a half cell setup. The experiment is performed in N2 saturated 0.1 M potassium hydroxide electrolyte with 900 rpm electrode rotation speed. The initial current density at 1 V vs. Ag/AgCl is 18.77 mAcm-2 which decreased to 9.87 mAcm-2 after the degradation test.

Figure 23:
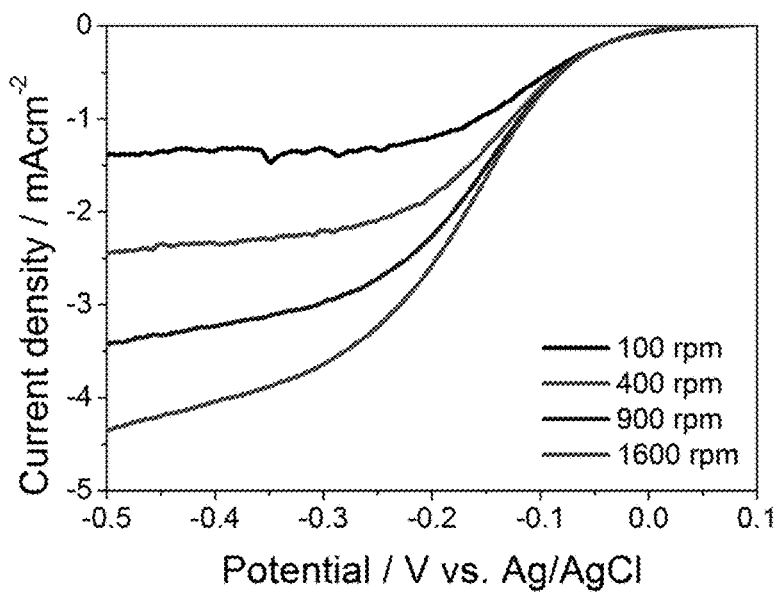
FIG. 23 shows ORR polarization curves for a LaNiO$_3$—NCNT bifunctional catalyst.

FIG. 23 shows ORR polarization curves for a bifunctional catalyst comprising a LaNiO3 core and a nitrogen doped carbon nanotube shell. The ORR polarization curves are obtained employing the rotating ring disk electrode voltammetry technique in a half cell setup. The experiment is performed in O2 saturated 0.1 M potassium hydroxide electrolyte. The background signal of the experiments was corrected by subtraction of the capacitive current recorded in nitrogen saturated electrolyte. The onset potential which describes the commencing of oxygen reaction is 0 V vs. Ag/AgCl. The current density at −0.5 V vs. Ag/AgCl is −3.40 mAcm-2 for the polarization curve obtained under 900 rpm rotation. By setting the current density at −0.5 V as the limiting current, the half wave potential is determined to be −0.16 V vs. Ag/AgCl.

Figure 24:
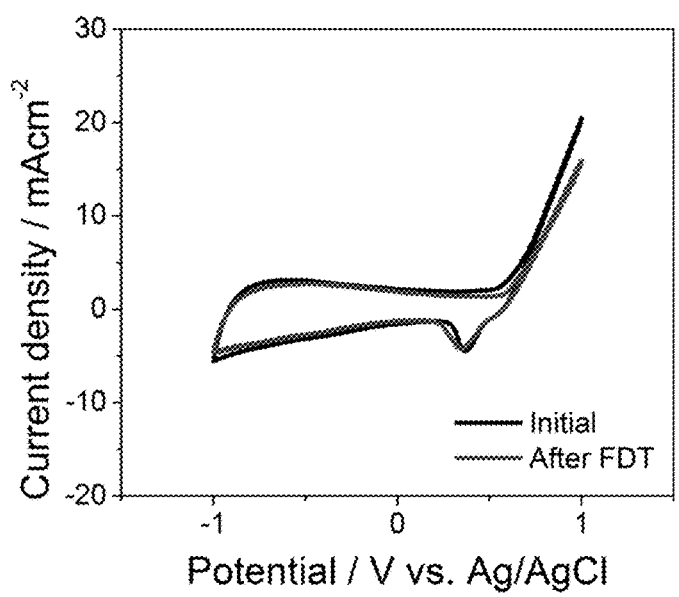
FIG. 24 shows the cyclic voltammogram representing the capacitive current and the OER performance of LaNiO$_3$—NCNT catalyst before and after FDT.

FIG. 24 shows the cyclic voltammograms for a LaNiO3-NCNT catalyst before and after full range degradation testing. The full range degradation plots are obtained employing the rotating ring disk electrode voltammetry technique in a half cell setup. The experiment is performed in N2 saturated 0.1 M potassium hydroxide electrolyte with 900 rpm electrode rotation speed. The initial current density at 1 V vs. Ag/AgCl is 20.51 mAcm-2 which decreased to 16.04 mAcm-2 after the degradation test.

Figure 25:
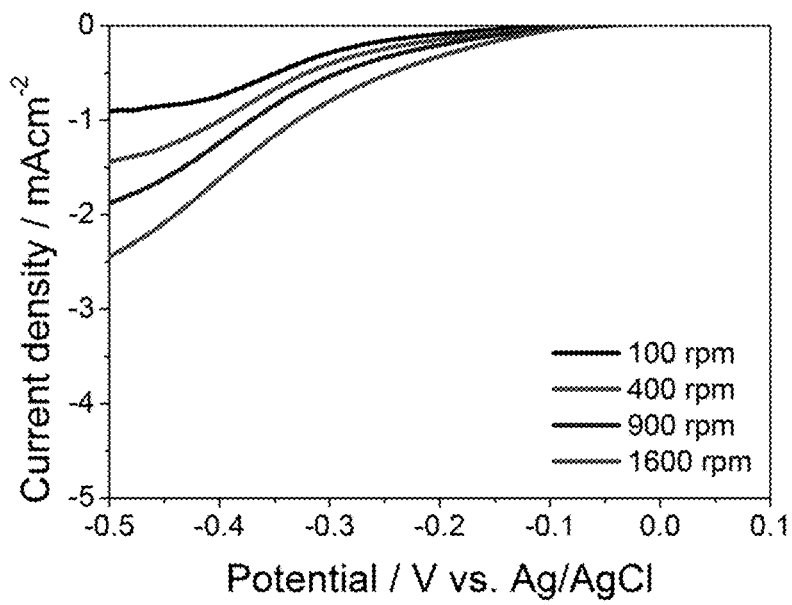
FIG. 25 shows ORR polarization curves for LaNiO$_3$ catalyst.

FIG. 25 shows polarization curves for a LaNiO3 catalyst alone. The ORR polarization curves are obtained employing the rotating ring disk electrode voltammetry technique in a half cell setup. The experiment is performed in O2 saturated 0.1 M potassium hydroxide electrolyte. The background signal of the experiments was corrected by subtraction of the capacitive current recorded in nitrogen saturated electrolyte. The onset potential which describes the commencing of oxygen reaction is −0.2 V vs. Ag/AgCl. The current density at −0.5 V vs. Ag/AgCl is −1.86 mAcm-2 for the polarization curve obtained under 900 rpm rotation. By setting the current density at −0.5 V as the limiting current, the half wave potential is determined to be −0.36 V vs. Ag/AgCl.

Figure 26:
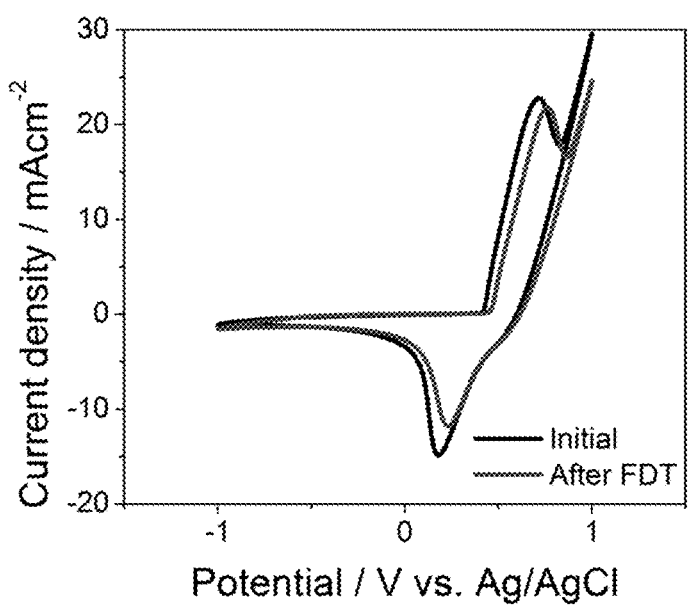
FIG. 26 shows the cyclic voltammogram representing the capacitive current and the OER performance of a LaNiO$_3$ catalyst before and after FDT.

FIG. 26 shows the cyclic voltammograms for a LaNiO3 catalyst before and after full range degradation testing. The full range degradation plots are obtained employing the rotating ring disk electrode voltammetry technique in a half cell setup. The experiment is performed in N2 saturated 0.1 M potassium hydroxide electrolyte with 900 rpm electrode rotation speed. The initial current density at 1 V vs. Ag/AgCl is 29.76 mAcm-2 which decreased to 24.57 mAcm-2 after the degradation test.

Figure 27:
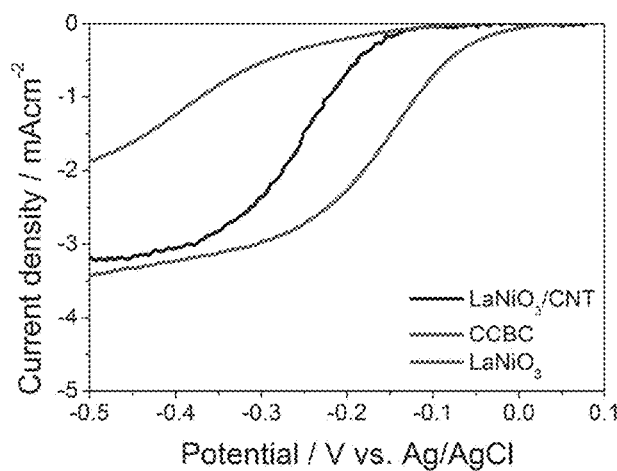
FIG. 27 shows a comparison of ORR polarization curves for three catalysts, LaNiO$_3$—CNT, LaNiO$_3$—NCNT (CCBC) and LaNiO$_3$.

A comparison of three catalysts, 1) LaNiO3-CNT bifunctional catalyst, 2) LaNiO3-NCNT bifunctional catalyst (CCBC) and 3) LaNiO3 is shown in FIG. 27, which includes ORR polarization curves for each of the three catalysts. The ORR polarization curves are obtained employing the rotating ring disk electrode voltammetry technique in a half cell setup. The experiment is performed in O2 saturated 0.1 M potassium hydroxide electrolyte. The background signal of the experiments was corrected by subtraction of the capacitive current recorded in nitrogen saturated electrolyte. The polarization curves illustrate the reduction of oxygen by the catalyst coated working electrode under 900 rpm rotation. Three parameters, onset potential, half wave potential and limiting current density are commonly used to evaluate the catalyst activity towards oxygen reduction reaction. The onset potential indicates the commencing of the reduction reaction; the half wave potential measures the potential at 50% of limiting current density, which represents the highest current density achievable at certain electrode rotation speed. The value of these parameters is shown in Table 9 below. The CCBC shows superior performance in every parameter investigated indicating its potential as electrocatalyst for oxygen reduction reaction.

TABLE 9

|  | $LaNiO_3$-CNT | CCBC | $LaNiO_3$ |
| --- | --- | --- | --- |
| Onset potential (V) | −0.12 | 0 | −0.2 |
| Half wave potential (V) | −0.25 | −0.16 | −0.36 |
| Limiting current density (mAcm$^{-2}$) | −3.21 | −3.40 | −1.86 |

Figure 28:
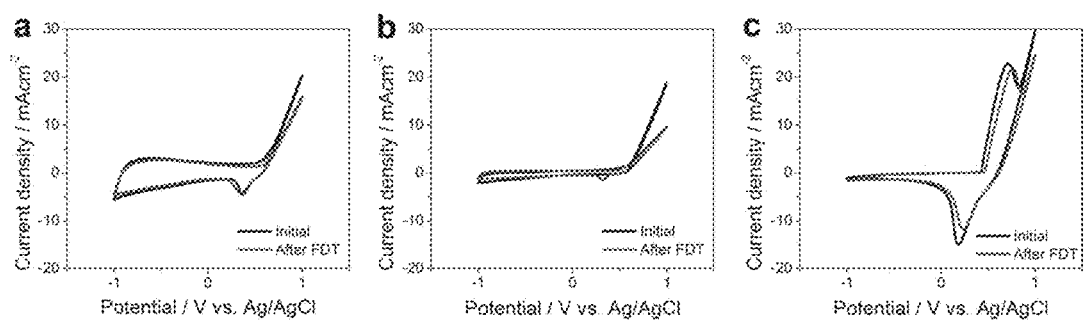
FIG. 28 shows a comparison of full range degradation plots for three catalysts, a) LaNiO$_3$—NCNT, b) LaNiO$_3$—CNT and c) LaNiO$_3$.

A comparison of full range degradation test results is provided in FIG. 28. The full range degradation plots are obtained employing the rotating ring disk electrode voltammetry technique in a half cell setup. The experiment is performed in $N_2$ saturated 0.1 M potassium hydroxide electrolyte. The ability to achieve high current density as anodic potential (1 V vs. Ag/AgCl) and the capability to retain high current density are preferred for bifunctional catalyst. Panel a in FIG. 28 displays the current density of $LaNiO_3$—NCNT catalyst before and after the full range degradation test. Panel b in FIG. 28 illustrates the same information for the $LaNiO_3$—CNT catalyst. The value of current density is summarized in the table below. Panel c in FIG. 28 illustrates the same information for the $LaNiO_3$ catalyst. The value of current density is summarized in Table 10 below. The CCBC catalyst illustrates similar OER stability compared to the $LaNiO_3$, this evidence in conjunction with the outstanding ORR activity observed in FIG. 27 further emphasize the great potential of the proposed catalyst design for achieving excellent bifunctional activity and stability.

TABLE 10

|  | $LaNiO_3$-CNT | CCBC | $LaNiO_3$ |
| --- | --- | --- | --- |
| Initial current density (mAcm$^{-2}$) | 18.77 | 20.51 | 29.76 |
| Current density after degradation (mAcm$^{-2}$) | 9.87 | 16.04 | 24.57 |
| Percentage change (%) | 47 | 22 | 17 |

Although the invention has been described with reference to certain specific embodiments, various modifications thereof will be apparent to those skilled in the art without departing from the purpose and scope of the invention as outlined in the claims appended hereto. Any examples provided herein are included solely for the purpose of illustrating the invention and are not intended to limit the invention in any way. The scope of the claims should not be limited by the preferred embodiments set forth in the examples but should give the broadest interpretation consistent with the description as a whole. Any drawings provided herein are solely for the purpose of illustrating various aspects of the invention and are not intended to be drawn to scale or to limit the invention in any way. The disclosures of all prior art recited herein are incorporated herein by reference in their entirety.

REFERENCES

The following references are provided as examples of the known art relating to the present invention. The following listing is not intended to comprise a comprehensive list of all relevant art. The entire contents of all references listed in the present specification, including the following documents, are incorporated herein by reference.

References Relating to

1. Jörissen et al. (2006). Journal of Power Sources 155. 23-32.
2. Lu, Y.-C.; Xu, Z.; Gasteiger, H. A.; Chen, S.; Hamad-Schifferli, K; Shao-Horn, Y., Platinum-gold nanoparticles: A highly active bifunctional electrocatalyst for rechargeable lithium-air batteries. J. Am. Chem. Soc. 2010, 132, 12170-12171.
3. US2007/0166602 A1
4. US 2007/0111095 A1
5. US 2004/0048215 A1
6. Bursell, M.; Pirjamali, M.; Kiros, Y., La0.6Ca0.4CoO3, La0.1Ca0.9MnO3 and LaNiO3 as bifunctional oxygen electrodes. Electrochim. Acta 2002, 47, 1651-1660.
7. Chen, Z.; Choi, J. Y.; Wang, H. J.; Li, H.; Chen, Z. W., Highly durable and active non-precious air cathode catalyst for zinc air battery. J Power Sources 2011, 196, 3673-3677.
8. Chen, Z.; Higgins, D.; Tao, H. S.; Hsu, R. S.; Chen, Z. W., Highly Active Nitrogen-Doped Carbon Nanotubes for Oxygen Reduction Reaction in Fuel Cell Applications. J. Phys. Chem. C 2009, 113, 21008-21013.
9. Choi, J. Y.; Hsu, R. S.; Chen, Z., Highly Active Porous Carbon-Supported Nonprecious Metal-N Electrocatalyst for Oxygen Reduction Reaction in PEM Fuel Cells. J. Phys. Chem. C 2010, 114, 8048-8053.
10. Lefevre, M.; Proietti, E.; Jaouen, F.; Dodelet, J. P., Iron-based catalysts with improved oxygen reduction activity in polymer electrolyte fuel cells. Science 2009, 324, 71-74.
11. Zhu, S. M.; Chen, Z.; Li, B.; Higgins, D.; Wang, H. J.; Li, H.; Chen, Z. W., Nitrogen-doped carbon nanotubes as air cathode catalysts in zinc-air battery. Electrochim. Acta 2011, 56, 5080-5084.
12. Gong, K. P.; Du, F.; Xia, Z. H.; Durstock, M.; Dai, L. M., Nitrogen-Doped Carbon Nanotube Arrays with High Electrocatalytic Activity for Oxygen Reduction. Science 2009, 323, 760-764.
13. Qu, L. T.; Liu, Y.; Baek, J. B.; Dai, L. M., Nitrogen-Doped Graphene as Efficient Metal-Free Electrocatalyst for Oxygen Reduction in Fuel Cells. Acs Nano 2010, 4, 1321-1326.
14. Tang, Y. F.; Allen, B. L.; Kauffman, D. R.; Star, A., Electrocatalytic Activity of Nitrogen-Doped Carbon Nanotube Cups. J. Am. Chem. Soc. 2009, 131, 13200-13201.
15. Baker, R.; Wilkinson, D. P.; Zhang, J., Electrocatalytic activity and stability of substituted iron phthalocyanines towards oxygen reduction evaluated at different temperatures. Electrochim. Acta 2008, 53, 6906-6919.
16. Bezerra, C. W. B.; Zhang, L.; Lee, K.; Liu, H.; Zhang, J.; Shi, Z.; Marques, A. L. B.; Marques, E. P.; Wu, S., Novel carbon-supported Fe—N electrocatalysts synthesized through heat treatment of iron tripyridyl triazine complexes for the PEM fuel cell oxygen reduction reaction. Electrochim Acta 2008, 53, 7703-7710.
17. Bezerra, C. W. B.; Zhang, L.; Liu, H.; Lee, K.; Marques, A. L. B.; Marques, E. P.; Wang, H.; Zhang, J., A review of heat-treatment effects on activity and stability of PEM fuel cell catalysts for oxygen reduction reaction. J Power Sources 2007, 173, 891-908.
18. Lee, K.; Zhang, L.; Lui, H.; Hui, R.; Shi, Z.; Zhang, J., Oxygen reduction reaction (ORR) catalyzed by carbon-supported cobalt polypyrrole (Co-PPy/C) electrocatalysts. Electrochim. Acta 2009, 54, 4704-4711.
19. Liu, H.; Song, C.; Tang, Y.; Zhang, J., High-surface-area CoTMPP/C synthesized by ultrasonic spray pyrolysis for PEM fuel cell electrocatalysts. Electrochim Acta 2007, 52, 4532-4538.
20. Kundu, S., et al., The formation of nitrogen containing functional groups on carbon nanotube surfaces: a quantitative XPS and TPD study. Phys. Chem. Chem. Phys. 2010, 12, 4351-4359.
21. Chen, Z.; Higgins, D.; Chen, Z. W., Nitrogen doped carbon nanotubes and their impact on the oxygen reduction reaction in fuel cells. Carbon 2010, 48, 3057-3065.
22. Gorlin, Y.; Jaramillo, T. F., A Bifunctional Nonprecious Metal Catalyst for Oxygen Reduction and Water Oxidation. J Am Chem Soc 2010, 132, 13612-13614.
23. Jaouen, F.; Dodelet, J. P., O2 reduction mechanism on non-noble metal catalysts for PEM fuel cells. Part I: Experimental rates of $O_2$ electroreduction, $H_2O_2$ electroreduction, and H2O2 disproportionation. J. Phys. Chem. C 2009, 113, 15422-15432.
24. Cui, L. F.; Yang, Y.; Hsu, C. M.; Cui, Y., Carbon-Silicon Core-Shell Nanowires as High Capacity Electrode for Lithium Ion Batteries. Nano Lett. 2009, 9, 3370-3374.
25. Chan, C. K.; Peng, H. L.; Twesten, R. D.; Jarausch, K.; Zhang, X. F.; Cui, Y., Fast, completely reversible Li insertion in vanadium pentoxide nanoribbons. Nano Lett. 2007, 7, 490-495.
26. Lee, H. W.; Muralidharan, P.; Ruffo, R.; Mari, C. M.; Cui, Y.; Kim, D. K., Ultrathin Spinel LiMn(2)O(4) Nanowires as High Power Cathode Materials for Li-Ion Batteries. Nano Lett. 2010, 10, 3852-3856.
27. Park, M. H.; Kim, M. G.; Joo, J.; Kim, K.; Kim, J.; Ahn, S.; Cui, Y.; Cho, J., Silicon Nanotube Battery Anodes. Nano Lett. 2009, 9, 3844-3847.
28. Zheng, G. Y.; Yang, Y.; Cha, J. J.; Hong, S. S.; Cui, Y., Hollow Carbon Nanofiber-Encapsulated Sulfur Cathodes for High Specific Capacity Rechargeable Lithium Batteries. Nano Lett. 2011, 11, 4462-4467.
29. Lukic, S. M.; Cao, J.; Bansal, R. C.; Rodriguez, F.; Emadi, A., Energy storage systems for automotive applications. Ieee T Ind Electron 2008, 55, 2258-2267.
30. Girishkumar, G.; McCloskey, B.; Luntz, A. C.; Swanson, S.; Wilcke, W., Lithium—Air Battery: Promise and Challenges. J. Phys. Chem. Lett. 2010, 1, 2193-2203.
31. Wagner, F. T.; Lakshmanan, B.; Mathias, M. F., Electrochemistry and the Future of the Automobile. J Phys Chem Lett 2010, 1, 2204-2219.
32. Scrosati, B.; Garche, J., Lithium batteries: Status, prospects and future. J. Power Sources 2010, 195, 2419-2430.

33. Lee, J. S.; Tai Kim, S.; Cao, R.; Choi, N. S.; Liu, M.; Lee, K. T.; Cho, J., Metal-Air Batteries with High Energy Density: Li-Air versus Zn-Air. *Adv. Energy Mater.* 2010, 1, 34-50.
34. Lee, J. S.; S., P. G.; Lee, H. I.; Kim, S. T.; Cao, R. G.; Liu, M. L.; Cho, J., Ketjenblack Carbon Supported Amorphous Manganese Oxides Nanowires as Highly Efficient Electrocatalyst for Oxygen Reduction Reaction in Alkaline Solutions. *Nano Lett* 2011, 11, 5362-5366.
35. Neburchilov, V.; Wang, H.; Martin, J. J.; Qu, W., A review on air cathodes for zinc-air fuel cells. *J Power Sources* 2010, 195, 1271-1291.
36. Lu, Y. C.; Kwabi, D. G.; Yao, K. P. C.; Harding, J. R.; Zhou, J. G.; Zuin, L.; Shao-Horn, Y., The discharge rate capability of rechargeable Li—O(2) batteries. *Energ Environ Sci* 2011, 4, 2999-3007.
37. Chen, Z. W.; Higgins, D.; Yu, A. P.; Zhang, L.; Zhang, J. J., A review on non-precious metal electrocatalysts for PEM fuel cells. *Energ Environ Sci* 2011, 4, 3167-3192.
38. Lim, B. W.; Lu, X. M.; Jiang, M. J.; Camargo, P. H. C.; Cho, E. C.; Lee, E. P.; Xia, Y. N., Facile Synthesis of Highly Faceted Multioctahedral Pt Nanocrystals through Controlled Overgrowth. *Nano Lett.* 2008, 8, 4043-4047.
39. Lim, B.; Jiang, M. J.; Camargo, P. H. C.; Cho, E. C.; Tao, J.; Lu, X. M.; Zhu, Y. M.; Xia, Y. N., Pd—Pt Bimetallic Nanodendrites with High Activity for Oxygen Reduction. *Science* 2009, 324, 1302-1305.
40. Chen, J. Y.; Lim, B.; Lee, E. P.; Xia, Y. N., Shape-controlled synthesis of platinum nanocrystals for catalytic and electrocatalytic applications. *Nano Today* 2009, 4, 81-95.
41. Lim, B.; Jiang, M. J.; Yu, T.; Camargo, P. H. C.; Xia, Y. N., Nucleation and growth mechanisms for Pd—Pt bimetallic nanodendrites and their electrocatalytic properties. *Nano Res.* 2010, 3 (2), 69-80.
42. Shao, M. H.; Yu, T.; Odell, J. H.; Jin, M. S.; Xia, Y. N., Structural dependence of oxygen reduction reaction on palladium nanocrystals. *Chem. Commun.* 2011, 47, 6566-6568.
43. Yu, T.; Kim, D. Y.; Zhang, H.; Xia, Y. N., Platinum Concave Nanocubes with High-Index Facets and Their Enhanced Activity for Oxygen Reduction Reaction. *Angew. Chem. Int. Edit.* 2011, 50, 2773-2777.
44. Lim, B.; Yu, T. Y.; Xia, Y. N., Shaping a Bright Future for Platinum-Based Alloy Electrocatalysts. *Angew. Chem. Int. Edit.* 2010, 49, 9819-9820.
45. Lee, H.; Habas, S. E.; Kweskin, S.; Butcher, D.; Somorjai, G. A.; Yang, P., Morphological control of catalytically active platinum nanocrystals. *Angew. Chem. Int. Edit.* 2006, 118, 7988-7992.
46. Chen, Z.; Waje, M.; Li, W.; Yan, Y., Supportless Pt and PtPd Nanotubes as Electrocatalysts for Oxygen Reduction Reactions. *Angew. Chem. Int. Edit.* 2007, 119, 4138-4141.
47. Suntivich, J.; May, K. J.; Gasteiger, H. A.; Goodenough, J. B.; Shao-Horn, Y., A Perovskite Oxide Optimized for Oxygen Evolution Catalysis from Molecular Orbital Principles. *Science,* 2011, 334, 1383-1385.
48. Higgins, D.; Chen, Z.; Chen, Z. W., Nitrogen doped carbon nanotubes synthesized from aliphatic diamines for oxygen reduction reaction. *Electrochim Acta* 2011, 56, 1570-1575.
49. Gamburzev, S. et al. Development of a novel metal hydride-air secondary battery. *J. Appl. Electrochem.* 28, 545-549 (1998).
50. Wu, G., Cui, G., Li, D., Shen, P.-K. & Li, N. Carbon-supported $Co_{1.67}Te_2$ nanoparticles as electrocatalysts for oxygen reduction reaction in alkaline electrolyte. *J. Mater. Chem.* 19, 6581-6589 (2009).
51. Zhang, G.-Q., Zhang, X.-G. & Li, H.-L. Self-assembly preparation of mesoporous hollow nanospheric manganese dioxide and its application in zinc-air battery. *J. Solid State Electrochem.* 10, 995-1001 (2006).
52. Thiele, D. & Zuttel, A. Electrochemical characterisation of air electrodes based on $La_{0.6}Sr_{0.4}CoO_3$ and carbon nanotubes. *J. Power Sources* 183, 590-594 (2008).
53. Bugga, R. V., G. Halpert, et al. (1997). U.S. Pat. No. 5,656,388.
54. Dempsey, R. M., A. R. Fragala, et al. (1984). U.S. Pat. No. 4,457,824.
55. Dopp, R. B., D. Carpenter, et al. (2007). U.S. Publication No. 2012/0100986.
56. Dopp, R. B., K. McGrath, et al. (2008). U.S. Publication No. 2010/0167175.
57. Horowitz, H. S., J. M. Longo, et al. (1979). U.S. Pat. No. 4,146,458.
58. Morcos, I. (1978). U.S. Pat. No. 4,115,322.
59. Ndzebet, E., K. Ramaswami, et al. (2003). U.S. Publication No. 2003/0173548.
60. Padhi, A. K., D. D. Carpenter, et al. (2007). U.S. Publication No. 2007/0111095.

What is claimed is:

1. A bifunctional catalyst for an air metal battery or fuel cell comprising:
    a) a core comprising one or more metal oxides and
    b) a porous shell comprising two or more carbon nanostructures and wherein,
    the carbon nanostructures are rods, wires, fibers or tubes having an elongate structure wherein one end of the elongate structure is bound to the core and the carbon nanostructures extending from the surface of the core form the porous shell and wherein,
    the porous shell functions predominantly as an oxygen reduction reaction catalyst while allowing access to the core which functions predominantly as an oxygen evolution reaction catalyst.
2. The bifunctional catalyst according to claim 1 wherein the metal oxide is $La_{n+1}Ni_nO_{3n+1}$, wherein n is greater than or equal to 0 and less than or equal to 1.
3. The bifunctional catalyst according to claim 1 wherein the metal oxide is $La_{1-x}A_xFe_{1-y}Mn_yO_3$ wherein A is Sr or Ca wherein x is greater than or equal to 0 and less than or equal to 1 and wherein y is greater than or equal to 0 and less than or equal to 1.
4. The bifunctional catalyst according to claim 1 wherein the metal oxide is $La_{0.6}Ca_{0.4}CO_{1-x}B_xO_3$ wherein B is Mn, Fe, Co, Ni or Cu wherein x is greater than or equal to 0 and less than or equal to 1.
5. The bifunctional catalyst according to claim 1 wherein the metal oxide is $AB_2O_4$, wherein A is Mg, Fe, Ni, Mn, or Zn and B is Al, Fe, Cr, or Mn.
6. The bifunctional catalyst according to claim 1 wherein the metal oxide is $Pb2M2-xPbxO7$ wherein M is Ru or Ir.
7. The bifunctional catalyst according to claim 1 wherein the carbon nanostructure is a carbon nanotube or a carbon nanofibre.
8. The bifunctional catalyst according to claim 1 wherein the carbon nanostructure is a carbon nanotube.

9. The bifunctional catalyst according to claim 1 wherein the carbon nanostructure is nitrogen doped or boron doped.

10. The bifunctional catalyst according to claim 1 wherein the carbon nanostructure is nitrogen doped.

11. The bifunctional catalyst according to claim 1 wherein the particle size of the bifunctional catalyst is about 100 nm to about 10 μm.

12. The bifunctional catalyst according to claim 1 prepared by the method comprising:
   a) obtaining a metal oxide core material
   b) depositing a carbon nanostructure on the metal oxide core.

13. The bifunctional catalyst according to claim 12, wherein the deposition of the carbon nanostructure is by chemical vapour deposition.

14. An air electrode comprising a bifunctional catalyst according to claim 1.

15. A metal air battery or fuel cell comprising a bifunctional catalyst according to claim 1.

16. A bifunctional catalyst for an air metal battery or fuel cell comprising:
   a) a core comprising two or more metal oxides wherein the metal oxide contains lanthanum (La) and
   b) a porous shell comprising two or more carbon nanostructures wherein the two or more carbon nanostructures are configured to allow access to the core; and
   wherein,
   the porous shell functions predominantly as an oxygen reduction reaction catalyst while allowing access to the core which functions predominantly as an oxygen evolution reaction catalyst.

\* \* \* \* \*